US012361799B2

(12) United States Patent
Bergmann et al.

(10) Patent No.: US 12,361,799 B2
(45) Date of Patent: Jul. 15, 2025

(54) ELECTRONIC RETAIL SELF-CHECKOUT SYSTEM

(71) Applicant: PAYFREE GMBH, Düsseldorf (DE)

(72) Inventors: Nils Bergmann, Düsseldorf (DE); Nino Raddao, Düsseldorf (DE); Moritz Wiechmann, Düsseldorf (DE)

(73) Assignee: PAYFREE GMBH, Duesseldorf (DE)

( * ) Notice: Subject to any disclaimer, the term of this patent is extended or adjusted under 35 U.S.C. 154(b) by 0 days.

(21) Appl. No.: 18/286,711

(22) PCT Filed: May 4, 2022

(86) PCT No.: PCT/EP2022/061897
§ 371 (c)(1),
(2) Date: Oct. 12, 2023

(87) PCT Pub. No.: WO2022/233900
PCT Pub. Date: Nov. 10, 2022

(65) Prior Publication Data
US 2024/0194035 A1    Jun. 13, 2024

(30) Foreign Application Priority Data
May 4, 2021 (EP) .................................. 21172138

(51) Int. Cl.
*G07G 1/00* (2006.01)
*G06Q 20/20* (2012.01)
(Continued)

(52) U.S. Cl.
CPC ........... *G07G 1/009* (2013.01); *G06Q 20/208* (2013.01); *G06Q 20/3278* (2013.01); *G06Q 20/40155* (2020.05)

(58) Field of Classification Search
None
See application file for complete search history.

(56) References Cited

U.S. PATENT DOCUMENTS 12,086,783 B1 * 9/2024 Justen ................... G07G 1/0045
12,107,925 B2 * 10/2024 Stocks ................ H04L 63/0807
(Continued)

FOREIGN PATENT DOCUMENTS

EP         2913807 A1    9/2015
JP       2016162177 A    9/2016

*Primary Examiner* — Fekadeselassie Girma
(74) *Attorney, Agent, or Firm* — PERRY + CURRIER INC.

(57) ABSTRACT

The invention relates to a method executed by an electronic retail self-checkout system, the method comprising: receiving (102), by a server computer (612), a terminal-check-in request from the portable telecommunication device of a customer, the terminal-check-in request comprising a customer-ID of the customer and comprising beacon signal information indicative of the one of the one or more checkout-terminals where the customer tries to perform the terminal-check-in; reading (104), by a scanning unit of a checkout-terminal, information from product tags attached to goods positioned in and/or within a predefined distance to a cavity of the scanning unit; upon determining (106), by the checkout-terminal via a person-presence-sensor, that a person is present in and/or moves within an area (210, 212) within a predefined spatial proximity of the checkout-terminal, sending (108) a payment request to the server computer, the payment request comprising the read tag information and the terminal-ID of the one checkout-terminal; receiving (110), by the server computer, the payment request from the checkout-terminal; verifying (112), by the server computer, whether a time interval between receiving the terminal-check-in request and the payment request for the same one of the one or more checkout-terminals is below a threshold value; and only if the time interval is below the threshold, initializing (114) a payment transaction.

17 Claims, 9 Drawing Sheets

(51) Int. Cl.
    *G06Q 20/32*     (2012.01)
    *G06Q 20/40*     (2012.01)

(56) References Cited

U.S. PATENT DOCUMENTS

| | | | | |
|---|---|---|---|---|
| 12,169,865 | B2* | 12/2024 | Wolfe | G06Q 40/00 |
| 2010/0017327 | A1* | 1/2010 | Treadwell | G06Q 20/04 |
| | | | | 715/764 |
| 2011/0066550 | A1* | 3/2011 | Shank | G06Q 20/40 |
| | | | | 701/469 |
| 2011/0251892 | A1* | 10/2011 | Laracey | G06Q 20/20 |
| | | | | 705/16 |
| 2012/0187187 | A1* | 7/2012 | Duff | G06Q 10/00 |
| | | | | 235/382 |
| 2016/0012465 | A1* | 1/2016 | Sharp | G06Q 20/321 |
| | | | | 705/14.17 |
| 2019/0141021 | A1* | 5/2019 | Isaacson | G06Q 30/0635 |
| 2019/0213572 | A1* | 7/2019 | Imamura | G06K 7/10366 |
| 2019/0281030 | A1* | 9/2019 | Isaacson | H04L 63/0838 |
| 2021/0004797 | A1* | 1/2021 | Makhotin | G06Q 20/12 |
| 2021/0090056 | A1* | 3/2021 | Dopkeen | G06Q 20/32 |
| 2021/0174426 | A1* | 6/2021 | Isaacson | G07G 1/14 |
| 2021/0264756 | A1* | 8/2021 | Sagar | H04W 4/80 |

\* cited by examiner

ELECTRONIC RETAIL SELF-CHECKOUT SYSTEM

FIELD OF THE INVENTION

The invention relates to the field of electronic retail self-checkout systems and, more particularly, to a system configured to read product tags placed on goods, e.g., (electronic) RFID tags.

BACKGROUND AND RELATED ART

Document 1 (JP 2016-162177 A) describes a radio frequency (RF) tag (electronic tag) reading device provided for a point of sales (POS) device. Electronic tags are attached to goods and store respective pieces of price or identification information on the goods with the electronic tags.

US patent application US 2019/0213572 A1 discloses a checkout system which allows a customer passing through a customer path to move one or more goods along a goods path. The user performs a check-in at a check-in terminal, thereby specifying a settlement source. The terminal issues an identification tag which is associated with the settlement source. The identification tag is placed into a container, e.g., a shopping bag. Then, the customer places one or more goods in the container. In order to checkout, the customer moves along the customer path, thereby moving the container with the identification tag and the electronic tags on the goods through the goods path. While the container is moved along the goods path, electronic tags attached to the one or more goods are read to determine goods information such as the price. Then, a checkout step is performed based on the settlement source and based on the one goods information read from the tags.

SUMMARY

It is an objective of the present invention to provide for an improved checkout system and corresponding method as specified in the independent claims. Embodiments of the invention are given in the dependent claims. Embodiments of the present invention can be freely combined with each other if they are not mutually exclusive.

In one aspect, the invention relates to a method executed by an electronic retail self-checkout system. The system comprises:
one or more checkout-terminals; each checkout-terminal comprises a scanning unit and a person-presence-sensor;
a plurality of beacons per checkout-terminal, wherein a beacon is a hardware transmitter configured to broadcast a signal to nearby portable telecommunication devices for enabling the portable telecommunication devices to determine their position based on the signals; and
a server computer operatively coupled to portable telecommunication devices of multiple customers and operatively coupled to the one or more checkout-terminals.

The Method Comprises:
receiving, by the server computer, a terminal-check-in request from the portable telecommunication device of one of the customers, the terminal-check-in request comprising a customer-ID of the customer and comprising beacon signal information indicative of the one of the one or more checkout-terminals where the customer tries to perform the terminal-check-in; for example, the beacon signal information may have been emitted by the plurality of beacons of the one of the checkout-terminals where the customer tries to perform the terminal-check-in;
reading, by the scanning unit of the one checkout-terminal, information from (electronic) tags attached to goods positioned in and/or within a predefined distance to a cavity of the scanning unit;
upon determining, by the one checkout-terminal via its person-presence-sensor, that a person is present in and/or moves within an area within a predefined spatial proximity a predefined area of the one checkout-terminal, sending by the one checkout-terminal a payment request to the server computer, the payment request comprising the read tag information and the checkout-terminal-ID of the one checkout-terminal;
receiving, by the server computer, the payment request from the checkout-terminal;
verifying, by the server computer, whether a time interval between receiving the terminal-check-in request and the payment request for the same one of the one or more checkout-terminals is below a threshold value; and
only if the time interval is below the threshold, initializing, by the server computer, a payment transaction for the customer from whose portable telecommunication device the terminal-check-in request was received based on information in the payment request.

For example, the spatial proximity of the area and the checkout-terminal can mean a distance between the area where a customer stands and holds a container with goods into the scanning unit and the scanning unit of less than 2 m, preferably less than 1.5 m, e.g. less than 1 m. According to preferred embodiments, the client application is configured to determine, based on the beacon signals received from multiple beacons, if a customer is currently standing in the scanning area or in the payment area or outside of both areas. Preferably, this is achieved by means of a trained neural network which is able to perform a beacon-signal base position determination typically having an accuracy of at least 20 cm.

According to embodiments, the method comprises emitting, by the plurality of beacons of each of the checkout-terminals, a signal (also referred to as "beacon signal". This enables nearby portable telecommunication devices to receive the emitted beacon signals and use the beacon signals to determine their position.

Embodiments of the invention may have the advantage that a particularly secure self-checkout method is provided: for example, according to a payment method known in the art, the customer places an identity tag together with the goods to be bought into a shopping bag. While shopping, however, it can easily happen that the shopping bag is left unattended for some time and other customers can mistake the shopping bag for their own or even intentionally steal it. The danger is particularly great if the container is a large shopping cart, because these shopping carts often have to be left alone in the meantime, as it is too cumbersome to maneuver the large and possibly fully loaded cart through narrow rows of shelves. Moreover, with shopping baskets and bags provided by the store, confusion and theft can easily happen as the shopping baskets or bags all look the same. An identity tag placed in a shopping cart or basket, which is linked to a prepaid credit, can therefore very easily be misused by other careless or malicious customers to make purchases at the expense of other customers.

One option to prevent this scenario would be to introduce an additional authentication step at the checkout-terminal, e.g. requesting the customer to enter a PIN or to provide a biometric credential. However, this would significantly slow down the payment process and lead to longer queues before the checkout-terminals. Store operators would have to set up a larger number of checkout-terminals, which is expensive, not only because additional checkout-terminals would have to be purchased, but especially because retail space would be lost for the additional checkout-terminals.

Many checkout-terminals or checkout methods known in the art are either insecure or slow due to a manual authentication or confirmation step during the payment process, or both. To the contrary, embodiments of the invention avoid both disadvantages: an additional manual authentication step to initiate or confirm the payment process is not required. Typically, the only authentication step of a customer is performed before, upon or shortly after entering the shop and preferably the authentication is performed based using the portable telecommunication device of the respective customer so no extra checkout-terminal for the check-in needs to be provided by the owner of the shop. Nevertheless, the method of initiating the payment process and allocating the purchase price of the purchased goods to the payment source of a particular customer is secure against loss or theft of the shopping bag and/or against ID tag associated with an payment source of a customer.

In order to initiate a payment, the server computer must receive two types of requests in close temporal and spatial proximity to a specific checkout-terminal:

First, the server must receive from a customer's portable telecommunication device a request (terminal-check-in request) containing data that proves that this customer is in sufficiently close spatial proximity to a particular checkout-terminal at a particular time so that this customer (and only this customer) can be assumed to be currently at this particular checkout-terminal to scan and pay for his goods. For example, each checkout-terminal can be installed in close proximity to several beacons that permanently emit signals indicating the position of the beacons and, explicitly or implicitly, the identity and/or the position of checkout-terminal associated with these beacons. The location information can be used by the portable telecommunication device of the customer to determine the customer's current location and distance to all checkout-terminals close enough to the customer to allow the customer's portable telecommunication device to receive these checkout-terminal(s)' beacon signals. Hence, the beacon signals allow the customer to determine his position relative to a specified area of this checkout-terminal (and any other checkout-terminal in sufficient proximity) with the help of his portable telecommunication device. This position information derived from the beacon signals can be incorporated into the termina-check-in-request by the customer's portable telecommunication device to prove that this customer is actually at this particular checkout-terminal at the time the terminal-check-in-request is transmitted.

This way of determining the position of the customer relative to the checkout-terminal(s) of a shop has the further benefit of ensuring that the shop owner is not able to track the customer during the shopping tour: as the position determination is performed by the portable telecommunication device of the customer based on beacon signals, the portable telecommunication device of the customer is the only entity who knows the trace of the customer while collecting the goods for purchase.

Second, the server computer must receive a payment request from this checkout-terminal. This payment request may contain product-related data, for example a list of all goods that have been captured by the scanner unit and their total and/or individual price. The payment request from the checkout-terminal preferably does not contain any data revealing the identity of the customer, since the identity of the customer is not known to the checkout-terminal and does not have to be known for initiating the payment: the very fact that the checkout-terminal does not need to know the identity of the customer who has just scanned or wants to scan his or her goods makes it possible to omit any authentication step at the checkout-terminal and thus enables a very fast and secure execution of a scanning and payment process. For example, the checkout-terminal can capture other parameters that can be determined much more quickly, in order to determine if the person currently at the checkout-terminal actually wants to pay. For example, the customer's intention to pay the scanned goods can be reliably determined by recording that he or she has entered a certain area next to the scanning unit. It is neither necessary nor intended according to embodiments of the invention to record the customer's identity for this purpose.

In the background, the server computer matches the payment requests received from all checkout-terminals installed in a particular store with the terminal check-in requests received from all customers currently in the store via their portable telecommunication devices in order to identify pairs of terminal-check-in requests and payment requests that relate to the same checkout-terminal and have been received in close temporal proximity. Depending on the configuration of the system, in close temporal proximity may mean, for example, that the times of receipt of a terminal-check-in-request and a payment request referring to the same checkout-terminal must be no more than 10 seconds apart, preferably no more than 5 seconds apart, preferably no more than 1 seconds apart. Otherwise, an association of a customer's payment source identified in a terminal-check-in request and a payment request receive from a checkout-terminal does not take place and the server refuses to conduct or initiate the requested payment transaction.

According to embodiments, at least some of the beacons assigned to a particular checkout-terminal are attached to predefined elements or sub-units of the checkout-terminal, preferably such that the beacons do not all lie on the same axis.

According to some embodiments, at least some of the beacons assigned to a particular checkout-terminal are attached to the ceiling or wall of a room where the checkout-terminal is installed. This may be beneficial because the different beacons may not only differ in respect to their x- and y-position (of a 2D coordinate system representing e.g., the floor surface plane or a plane parallel to the surface plane) but also in respect to their z-axis position. This may ensure that not all beacons assigned to the same 2D plane.

According to some embodiments, the client application is configured to send a check-in-cancellation request to the server computer in response to determining, based on the received beacon signals, that the portable telecommunication device on which the client application is instantiated is more than a predefined distance away from the checkout-terminal (or area next to this checkout-terminal) in respect to which a terminal-check-in-request was submitted by the client application previously. For example, the client application may determine that the customer has left a scanning area or is more than a predefined distance, e.g., 40 cm, away from the checkout-terminal for which a terminal-check-in-request was submitted previously. The server is configured for canceling, in response to receiving a check-in-cancelation-request, any terminal-check-in-request received from the same customer in respect to the same checkout-terminal.

According to embodiments, the area comprises a scanning area and a payment area.

According to embodiments, the checkout-terminal is configured for continuously determining the number of persons standing in the scanning area and/or on the payment area via the person-presence-sensor.

The detection of the presence of a person on the scanning area and on the payment area may trigger different actions, e.g. the submission of a terminal-check-in-request if a person enters the scanning area or the submission of a payment-request if the person enters the payment area.

According to preferred embodiments, the checkout-terminal is configured not to send the payment-request in case a) the number of persons standing on the scanning area exceeds 1 or in case b) the number of persons standing on the payment area exceeds 1 or c) the number of persons standing on the scanning area and the payment area combined exceeds 1.

For example, the method can provide that if the checkout-terminal detects that several people are standing on the scanning area on the payment area, it can abort the scanning process and/or the payment process, since the respective process can no longer be clearly assigned to a person. Preferably, a scanning process as well as the payment process is also aborted if at least one person is standing on each of the two areas, since in this case it can no longer be clearly determined whether a person intentionally wants to trigger the payment process by crossing from the scanning area to the payment area. In addition, the presence of several persons in such close proximity to the checkout-terminal could lead to errors in the determination of the identity of the customer who is closest to the checkout-terminal and from whose payment source the purchase price is to be debited. Hence, by continuously monitoring the number of persons standing in the scanning area and the payment area, errors during the payment process can be prevented.

According to embodiments, in each of the checkout-terminals, the scanning unit can be mechanically coupled to a base plate comprising the scanning area and the payment area. For example, the base plate can be made of metal, wood, plastic or any other material or material composition. The base plate preferably comprises one or more light sources, e.g. LED lights of different color. Using a base plate which is mechanically coupled to the checkout-terminal may have the advantage of mechanically stabilizing the checkout-terminal.

According to other embodiments, the checkout-terminal does not comprise and is not coupled to a base plate. Nevertheless, also checkout-terminals of these embodiments may comprise or be operatively coupled to one or more light sources (e.g. LED lamps, LED panels, beamers, Lasers, etc.) which can guide a customer during the checkout process.

According to one embodiment, the light source is a beamer and the scanning area and the payment area are surface areas of the floor of the shop next to the checkout-terminal which are irradiated and highlighted by the beamer.

The method further comprises controlling, by the checkout-terminal, the operation of the light sources (which may be, for example, be part of a base plate or part of the scanning unit or which may be installed on the ceiling or a wall of the shop) such that the customer is guided to enter the scanning area for causing the person-presence-sensor to determine that the customer is present in the scanning area (210) and to initialize the reading of the tags and/or such that the customer is guided to enter the payment area for causing the person-presence-sensor to determine that the customer has entered the payment area (212) and to initialize the payment of the goods via the sending of the payment request.

For example, initially only the scanner area may be illuminated to indicate to the customer that he or she should first enter this area and insert the shopping container into the scanner unit. After successfully scanning and sending a payment request to the server, and preferably after receiving confirmation from the server that the payment request has been successfully associated with a customer and the customer's terminal-check-in-request, the checkout-terminal may be configured to then disable illumination of the scanner area and instead illuminate the payment area to indicate to the customer that he or she may complete the purchase transaction and pay for the scanned goods by entering the payment area.

According to some examples, the checkout-terminal may additionally include a display that shows the customer a list of the scanned goods and their price, preferably including the total price, and prompts the customer to initiate payment by entering the payment area via a supplemental explanatory text.

This can be advantageous as it provides a particularly intuitive way of guiding the customer through the scanning and payment procedure. In addition, some light sources can be used to indicate problems during the scanning process or during server-side request mapping. For example, if a container-presence-sensor detects that the container has not been properly or fully inserted into the scanner unit, additional light sources and/or audible alerts may be activated to notify the customer or the staff of the problem and/or to prompt him or her to reposition the container in the scanner unit.

According to embodiments, the checkout-terminal is configured to automatically initiate the scanning unit to start reading the information on the tags of the goods in the cavity of the scanning unit upon the person-presence-sensor determining that a person has entered the scanning area.

In addition, or alternatively, the checkout-terminal is configured to automatically send the payment request to the server computer upon the person-presence-sensor determining that a person moved from the scanning area to the purchase area.

This may be advantageous because a highly intuitive and fast checkout method may be provided which does not require a user to authenticate at a checkout-terminal: the assignment of the scanned goods to the payment source of a particular customer is performed by the server computer based on a time-dependent request mapping process.

People are used to implicitly expressing their will through their actions and movements, for example in the classic sales process by placing goods on the checkout conveyor belt or by inserting EC cards into openings of payment-terminals. Here, the actions to be performed are much faster and quicker: a customer only has to stand on the scanning area and insert his shopping bag or shopping cart into the scanner unit to start the scanning process fully automatically. Once the scanning process has been successfully completed and the respective payment request assigned by the server to the payment source of this customer, which may be after a fraction of a second or a few seconds, this is indicated to the customer. The customer now only has to take one more step and enter the payment area to trigger the payment and go home with the purchased goods.

Preferably, the only moment when the user has to manually interact with a device for authentication is at the beginning of the shopping process when the customer authenticates at his or her portable telecommunication device (e.g. at an application program installed on the portable telecommunication device which is interoperable with a server program installed on the server computer). No extra checkout-terminal for this check-in is required, thereby avoiding queues and saving valuable sales space. As the customer authentication is performed at the beginning of the shopping process, in some cases even before the customer enters a shop, also highly secure and typically more time-consuming authentication approaches can be implemented without inducing queues at the checkout-terminals. According to some embodiments, the customer authenticates at his or her portable telecommunication device via strong customer authentication (SCA) comprising a two-factor authentication step. SCA-based authentication ensures that electronic payments are performed with multi-factor authentication, thereby increasing the security of electronic payments. Physical card transactions already commonly have what could be termed strong customer authentication in the EU (Chip and PIN), but this has not generally been true for online-transactions and many contactless card payments do not use a second authentication factor. For example, the authentication can be performed in accordance with the PSD2 (Payment Services Directive2) directive.

According to embodiments, the person-presence-sensor comprises an ultrasonic sensor and/or an optic sensor.

For example, one or more ultrasonic sensors may be arranged on one side of the scanner unit, preferably near the floor, and oriented to detect objects located on the scanner area and on the payment area. Preferably, the checkout-terminal includes an integrated data processing unit configured to analyze the measurement data provided by the person-presence-sensors (ultrasonic waves reflected from the ground and, if applicable, from objects located on the surfaces) to determine whether one or more persons are located on the scanner surface or the payment surface.

In addition, or alternatively, the person-presence-sensor may comprise one or more optical sensors, for example laser-based sensors, for example laser-based TOF sensors, positioned and oriented as described for the ultrasonic sensors, and whose signals are analyzed by the data processing unit.

The use of ultrasonic sensors or optical sensors has the advantage that the corresponding sensor system works very reliably, and, above all, quickly. These sensor types can reliably determine whether there are more than two legs on the scanning area or the payment area and can quickly and accurately determine if and when a person has left or entered a predefined area.

According to a further embodiment, the person-presence-sensor can comprise one or more pressure sensors which are installed in the base plate in the scanning area and the payment surface, respectively. The pressure sensors are configured to measure in which subareas of the respective areas a weight is pressing on these subareas and how heavy this weight is.

The combination of said sensor systems for detecting the presence of persons on a particular area in combination with the request mapping performed on the server side can thus be performed many times faster than classic payment methods, which require authentication of the customer at the checkout-terminal by manual interaction with a portable telecommunication device or the checkout-terminal.

According to embodiments, the scanning unit comprises walls forming a canyon-shaped or tunnel-shaped cavity. The walls comprise one or more item sensors for scanning product tags attached to goods having been inserted into the container or having been positioned close to an opening of the scanning unit. For example, the product tags can be electronic tags, e.g. RFID-tags, and the sensors for scanning the product tags can be part of an RFID-System comprised in the scanning unit. The RFID-system comprises one or more RFID readers and RFID antennas connected to the RFID reader for detecting RFID tag signals.

In addition, or alternatively, the product tags can comprise optical product tags such as QR-codes or bar codes and the one or more sensors for scanning the product tags can be optical sensors, e.g. a laser-based QR-code reader or bar-code reader. The optical sensor may be used for scanning the tags of (large) products positioned outside of the cavity of the scanning unit. The side of the scanning unit facing towards the area where the presence of a person is to be detected (e.g. scanning area, payment area) comprises the person-presence-sensor.

According to preferred embodiments, the scanning unit comprises a combination of one or more electronic item sensors (e.g. RFID systems) and one or more optical sensors, whereby the electronic item sensors are positioned and oriented in the scanning unit such that they are adapted to scan electronic product tags of products comprised in the cavity of the scanning unit, and whereby the optical item sensors (e.g. laser-based bar-code readers or QR-code readers) are positioned and oriented in the scanning unit such that they are adapted to scan optical product tags of products located outside of the cavity of the scanning unit. For example, the optical item sensors can be positioned and oriented such that optical product tags of products which are too big to be inserted into the scanning unit and which have been placed on the upper opening of a "U" or "\/"-shaped scanner valley or which were placed below the lower opening of an "∩" or "/\"-shaped scanner tunnel.

This may have the advantage that the scanning unit can scan objects of a large variety of sizes and shapes. Thereby, electronic sensors, in particular RFID sensors, are used for scanning product tags of products located within the cavity of the scanning unit and the optical sensors are used for scanning optical product tags of products located outside of the scanning unit but preferably within a predefined distance from the optical sensors to ensure the optical sensors can scan the product tags.

For example, the optical sensors may also be located within the inner walls of the scanning unit (e.g. the inner walls of the insert unit) and may be able to detect/scan light which was reflected by product tags of products positioned next to the (longitudinal) opening of the scanning valley or tunnel.

According to other embodiments, the RFID reader is part of the base unit and the sender-antennas and the receiving-antennas are part of the insert unit and the sender-antennas are configured for exciting the passive RFID tag used as product tag. The RFID tags modulate the radio wave of the antennas whereby the modulation is detected by the receiver-antennas and forwarded to the RFID reader performing the signal analysis.

According to embodiments, the scanning unit comprises a base unit and an insert unit. The insert unit is designed as an exchange component (in other words: a replacement part) which can be repeatedly removed from and re-inserted into the base unit.

According to preferred embodiments, the one or more sensors or sensor systems for scanning the product tags (also referred to as "item sensors") and, optionally, one or more container-presence sensors are comprised in the insert unit and the one or more person-presence sensors are comprised in the base unit.

This may be advantageous, as it is possible to specifically adapt the scanning unit to the product assortment of different stores. The applicant has observed that it is difficult to size the scanning unit to provide optimal scanning results for all conceivable types of goods and sizes of electronic labels. For example, stores that sell textiles typically use relatively large(r) RFID tags, which has the advantage that the antennas on these tags are large enough to emit a strong signal that can be read easily. Textiles are also highly transmissive to radio waves, meaning that the radio signal used to excite the electronic tags, as well as the signal returned by those tags, is barely reflected or absorbed by the material of the textiles. Applicant has observed that for these types of materials and/or for large electronic labels, the use of scanner units with a relatively wide scanner canyon is advantageous, since a larger number of objects can be introduced into the width of the scanner canyon and read out simultaneously.

However, the dimensions of a scanner insert unit that provides fast and good reading results for textiles may be suboptimal for other product types or types of electronic labels and may lead to errors. For example, cosmetics are often sold in small glass or metal bottles that strongly reflect or absorb radio waves. In addition, the small size of these items means that the electronic labels must also be smaller. However, smaller antennas in the labels also provide only a weaker signal reflection, so the combination of a weak RFID tag signal reflection and strong material reflections or absorptions by the goods can lead to reading errors. For cosmetics and other goods with comparable characteristics in terms of size, absorption behavior and/or reflection behavior, scanner units whose scanner canyon has a narrower width are advantageous: the narrow width ensures that significantly fewer products can be present on a cross-sectional area of the canyon, so that mutual interference between the products and labels is minimized.

For example, the insert unit adapted for textiles or similar goods may have a canyon width of at least 25 cm, or at least 30 cm, or even at least 40 cm. The insert unit adapted for cosmetics and similar goods may have a canyon within the range of about 10 cm to 25 cm, e.g. 15 cm to 20 cm.

The fact that the scanner unit is designed as a combination of a base unit with a removable insert unit makes it possible to flexibly adapt the scanner unit of the checkout-terminal to the needs and product range of different shops. For example, it is possible for a store owner to install multiple checkout-terminals in their store, with the checkout-terminals having different inserts. For example, the cosmetics department of a department store could have checkout-terminals with a scanner unit with a narrow scanner canyon while the textile department of that department store has a checkout-terminal with a scanner unit with a wide scanner canyon. Thus, if necessary, the purchase could include several payment operations at different checkout-terminals, the use of which is adapted to the goods of each department.

According to embodiment, the base unit has U-shape and the insert unity is shaped and adapted to be inserted into the cavity formed by the "U". This may have the advantage that the insert unit is mechanically stabilized.

According to embodiment, the insert unit has "U"-shape or "\/"-shape, but other shapes are also possible, including a "∩"-shaped ("inverted-U-shaped) or "/\" shaped ("inverted-\/-shaped") insert units. In some embodiments, a set of multiple different insert units with multiple different shapes is provided for enabling the operator of a shop or other facility to customize the scanning unit to the shape of the offered goods or to other technical facilities in the shop by selecting one of the different insert units and inserting it into the base unit. For example, the "∩"-shaped or "/\" shaped insert unit may in addition comprise a conveyer belt or an opening allowing an integration or mechanical coupling of a conveyor belt for enabling an automated transport of the goods from an input end of the scanning unit to an output end of the scanning unit, whereby the scanning unit is configured to scan the product tags during the transport.

According to embodiments, the method further comprises:
   receiving, by the portable telecommunication device, authentication data from the customer before the customer has selected any one of the goods for purchase, in particular before, upon or after the user entering a shop but before checking out;
   upon successful authentication of the customer at the portable telecommunication device, starting, by the portable telecommunication device, a session, whereby a payment source of the customer is associated with the session, and wherein within the session the customer has pre-authorized any payment transaction (including the above-mentioned payment transaction to be initialized by a payment request) such that the payment transaction will be initialized without any further interaction of the customer with the portable telecommunication device or the checkout-terminal if the time interval is below the threshold, whereby payment transactions are disabled by the portable telecommunication device for the customer upon expiry of the session; and
   maintaining the session by the portable telecommunication device until the portable telecommunication device receives one of the following signals:
      a session termination command entered by the customer; and/or
      a session termination by time expiration; and/or
      a signal of the server computer that a payment transaction was performed successfully; and/or
      a signal of a client application installed on the portable telecommunication device indicating that the customer has left the shop; and/or
      a signal of a client application installed on the portable telecommunication device indicating that no beacon signal of sufficient strength is received.

For example, "after entering a shop" may mean within a predefined time limit, e.g. within some seconds or some minutes, but typically at least before the customer has completed selecting the goods to be purchased and before the customer approaches the checkout-terminal to initialize the scanning and payment process.

In some embodiments, the client application is configured to automatically terminate the session after a successful payment transaction, after a timeout after a payment transaction or after the determination that a minimum distance to the checkout-terminal was reached after payment. In other embodiments, the session is maintained over multiple payment transactions and/or over multiple shops. For example, a customer may authenticate at the client application only once at the begin of the shopping tour for creating a session with a pre-authorized monetary amount, and may then sequentially visit multiple stores, whereby the session is maintained over and used for multiple payment transactions in multiple different shops. The session is terminated upon an explicit logout request of the customer or upon a predefined (and comparatively long) time of inactivity.

According to embodiments, the portable telecommunication device comprises a client application and the server comprises a server application. The client application and the server application are configured such that the session established between the customer and the portable telecommunication device is propagated to the server application. The server application is configured to maintain a list of registered customers which currently have assigned an open session. The server application is configured to check if a customer for which both a terminal-check-in-request and a payment-request were received within the predefined time interval was received has currently assigned an active session. The server application will trigger the execution of the payment transaction only in case a currently active session is assigned to the customer. In case the client application detects that the session was terminated, the client application sends a message to the server application to indicate that the session was terminated for a particular customer.

Authentication data may be, for example, a PIN, a password, biometric data, or other evidence of knowledge and/or possession suitable for the customer to prove to his or her portable telecommunication device that he or she is the owner of a payment source, e.g., a bank account or credit card, he or she claims to be.

By authentication after entering a store may be meant, for example, that the customer authenticates himself or herself within a few seconds or minutes of entering the store, but in any case, before the customer has come close enough to a checkout-terminal to insert his or her purchases into the scanner unit. This ensures that no queues form at the checkout-terminals.

According to some embodiments, the goods whose product tags are read by the scanning unit are comprised in a container. The container can comprise a "container tag", typically an electronic tag, which encodes a unique identifier of the container ("container-ID"). For example, the shop may provide the container to the customer when the customer enters the shop. The container may be a container for one-time use or may be designed to be used many times. The container may be provided only temporarily for the duration of the shopping tour of the customer or may be provided to the customer permanently. The method can comprise a step of receiving, by the server computer system, a container-registration-request, the container registration request comprising a customer-ID of the one customer and a container-ID of a container to be assigned to the customer for at least the duration of the shopping process. For example, the container may comprise a QR-tag or RFID-tag which also encodes the container-ID and the customer may scan the container-ID via a camera of his or her portable telecommunication device. The portable telecommunication device decodes the container-ID and forwards the container-ID together with the customer-ID to the server, thereby notifying the server that a particular container is assigned to (or registered for) a particular customer at least for the current shopping tour (which corresponds to the current session of this customer in his or her client-app).

The customer will put the goods collected during the shopping tour into the container and the goods are scanned in the scanning-unit by introducing the container with the goods into the scanning unit. During the scanning (reading) of the information encoded in the product tags attached to the goods, also the container-ID is read by the scanning unit.

Typically, the encoded information comprises only a product-ID and additional information related to the product is stored in a product database accessible to the shop owner and/or to the server computer.

The payment-request sent to the server in addition comprises the container-ID. The server computer determines whether a container-registration-request was received comprising the said container-ID specified in the payment request and comprising the customer-ID of the customer for whom the payment transaction is to be initialized (based on a matching of the payment request with a terminal-registration-request received in close temporal proximity). The Server initializes the payment only if such a container-registration-request was received.

Typically, the container-registration-request will assign a container to the customer for the duration of the purchase (session of the client-app). The container registration process may be accomplished in a variety of ways. For example, as described, the client application may scan a QR code on the container containing that container ID and forward the container ID along with the customer ID to the server. However, it is also possible that the electronic label of the container is read by an RFID system when it is assigned to the customer, whereby the RFID reader transmits the read container ID to the server along with a client ID provided by the client, for example, manually or via an interface between reader device and the client application. The registration of a container for a customer is preferably terminated automatically when the customer has paid for the goods and the session of the client application (for the authenticated customer) is terminated.

On the server side, an additional checking step may be performed: the server not only checks if for the checkout-terminal from which a payment request was received, a terminal-check-in-request was currently received from a customer, but also checks whether the container, whose container ID is included in the payment request, is registered for this customer according to a previously received container-registration-request. Only if such a container-registration-request exists will the payment be initiated.

The additional container-based verification step may further increase the security of the process: if a customer's smartphone is lost during the shopping process, it would be conceivable that another customer uses the smartphone to make purchases with it. The open session of the client application would allow any person in possession of the smartphone to make purchases using the credit of the actual owner. By having the server additionally check that the goods to be purchased with a particular customer's money are also in a container having been registered for that customer, it can be ensured that a thief cannot pay with another customer's smartphone even if a particular payment transaction for the purchase has already been pre-authorized on the smartphone.

In addition to a mobile device of the customer and a container also other physical authenticators may be used. Additional authenticators may comprise a RFID or Beacon attachment/technology.

According to embodiments, the product tags attached to the goods (and/or the electronic tags attached to the containers, if any), are electronic tags, in particular RFID tags and the scanning unit comprises item sensors in the form of (RFID) readers, antennas and sensors. In addition, or alternatively, at least some of the product labels are optical labels, e.g. QR codes or bar codes and the item sensors are optical lasers, e.g. laser-based barcode or QR-code readers.

The feature that after a successful authentication the session is maintained until the purchase process has been successfully completed or terminated for various reasons by the customer or the server computer can be advantageous, because this ensures that the customer can at any time spontaneously take his goods placed in the shopping cart up to this point to the nearest checkout-terminal in order to pay there, without requiring any further manual interaction with the checkout-terminal or with the user's portable telecommunication device. After the initial authentication (initial check-in, system check-in), the user is typically considered authenticated during his entire stay in the store and can immediately complete the purchase and trigger the payment at a checkout-terminal by stepping on the corresponding areas and holding his purchases in the scanner unit.

According to embodiments, the method further comprising generating the terminal-check-in request. The generation of the terminal-check-in request comprises continuously while the customer moves within the shop and/or approaches any one of the one or more checkout-terminals, performing the following steps:

receiving, by the portable telecommunication device of the customer, beacon signals from multiple beacons of one or more of the one or more checkout-terminals, the beacon signals comprising information being indicative of the checkout-terminal to which each beacon is assigned;

determining, by the portable telecommunication device, the one of the one or more checkout-terminal being closest to the customer and determining the distance between the customer and to a specified area next to this nearest checkout-terminal as a function of the received beacon signals; for example, the client application of the portable telecommunication device may use a trained neural network for outputting, for each of the scanning area, the payment area and for the area outside of said two areas, the probability that said customer is currently within said area;

upon determining that the distance to the nearest checkout-terminal is below a predefined threshold value, automatically generating, by the portable telecommunication device, the terminal-check-in request, the terminal-check-in-request comprising an identifier of the determined nearest checkout-terminal.

The active determination of one's own position by the customer's portable telecommunication device based on the signals from the beacons can be advantageous because it allows providing a hands-free checkout method which does not inherently imply that the customer can be tracked by the owner of the store while shopping. If the allocation of the purchase price to a customer's payment source were to take place by assigning the customer a specific electronic label, the owner of the store would be able to identify via RFID technology at any time where a specific customer is in the store. Embodiments of the invention can prevent this because the determination of a customer's position and the determination of the distance to the nearest checkout-terminal is done by an application program on the customer's portable telecommunication device, not by a system component controlled by the store owner.

According to embodiments, the distance is determined using multilateration, in particular by using trilateration. In some embodiments, the distance is determined using multiangulation, in particular triangulation.

Various techniques for local position determination based on beacon technology meanwhile exist. The beacons can be, for example, iBeacons from Apple. The beacon signal can, for example, be specified as a "Bluetooth Advertising Events" signal. Alternative, similarly functioning methods for location determination by near field are also possible, e.g. position determination approaches using ultra-wideband (UWB) signals.

According to embodiments, the scanning unit comprises a container-presence-sensor. The method further comprising:

continuously or upon the person-presence-sensor determining that a person has entered a scanning area, determining, by the container-presence-sensor, the position of a container having been introduced into a cavity formed by the walls of the scanning unit; and in case the position and/or orientation of the container is determined to prevent a successful reading of the tags of all goods comprised in the container, preventing initialization of the scanning process and/or outputting a warning that the container is not placed properly in the scanning unit; and/or in case the position and/or orientation of the container is determined to allow successful reading of the tags of all goods comprised in the container, automatically performing the scanning process and/or enabling the initialization process upon determining that a person has entered a scanning area in spatial proximity to the scanning unit.

The described use of a container-presence-sensor can be advantageous because it can ensure that all products contained in the container are also detected by the scanner unit. For example, it can happen that a customer accidentally does not fully insert the container, for example a shopping bag, into the scanner unit or accidentally lifts the container partially out of the scanning area during the scanning process. By having the container-presence-sensor preferably check before and during the scanning process whether the container is fully contained in the scanner unit, the scanning process can be interrupted if necessary and the customer can be prompted to reposition the container correctly.

According to embodiments the container-presence-sensor comprises one or more ultrasonic sensors directed towards the cavity formed by the walls of the scanning unit and/or one or more time-of-flight (TOF)-based distance sensors directed towards the cavity formed by the walls of the scanning unit, the one or more TOF-sensors being in particular laser-based TOF sensors.

A benefit of ultrasound sensors is that they can be used for a large number of container materials since there are few ultrasound-absorbing materials. In addition, the wave-shaped propagation of the ultrasound offers a wider detection area, which means that a wide range of bag dimensions (e.g. folded or narrow paper bag with very small or flat bag contents and correspondingly small cross-section) can be reliably detected. However, applicant has observed that the use of ultrasonic sensors alone may be problematic because the resolution of this sensor type is low. Thus, if a small container is not fully inserted into the scanner unit or a very flat container is oriented such that the thin side of the container faces the ultrasonic sensors, ultrasonic sensors alone may not be able to detect the incorrect positioning.

A benefit of laser-based TOF is that the location determination for materials not fully absorbing the laser is highly accurate. However, the use of optical sensors alone to detect the position of the container within the scanner unit has proven problematic, as different container materials absorb the laser beams used to determine object dimensions and positions very differently. For example, a laser may pass the material of a shopping bag basically unaffected because the material does not absorb light of the laser's narrow spectral range. A material product made of metal contained in the bag could strongly absorb the laser, but another product in the bag, like the bag itself, could be virtually "invisible" to the laser. As a result, a purely laser-based container-presence-sensor would only detect the presence or position and size of the metal product and would not notice if any part of the bag containing the "invisible" product was outside the scanning unit. A further disadvantage of a purely laser-based sensor is that the detection area is directed to one point along a vector, so areas that cannot be detected for certain bag sizes (e.g., small or very narrow bags) may occur even with multiple sensors aligned across the scanner canyon.

Applicant has observed that a combination of the two types of sensors can very reliably detect the presence, size and position of containers of a wide variety of materials. The combination of the two sensor types is higher resolution and better robustness to interference from various materials.

In a further aspect, the invention relates to an electronic retail self-checkout system. The system comprises:
  one or more checkout-terminals respectively comprising:
    a scanning unit and a person-presence-sensor;
    a plurality of beacons per checkout-terminal, wherein a beacon is a hardware transmitter configured to broadcast a signal to nearby portable telecommunication devices for enabling the portable telecommunication devices to determine their position based on the signals; and
  a server computer operatively coupled to portable telecommunication devices of multiple customers and operatively coupled to the one or more checkout-terminals;
The System is Configured for:
  receiving, by the server computer, a terminal-check-in request from the portable telecommunication device of one of the customers, the terminal-check-in request comprising a customer-ID of the customer and comprising beacon signal information indicative of the one of the one or more checkout-terminals where the customer tries to perform the terminal-check-in;
  reading, by the scanning unit of the one checkout-terminal, information from (electronic) tags attached to goods positioned in and/or within a predefined distance to a cavity of the scanning unit;
  upon determining, by the one checkout-terminal via its person-presence-sensor, that a person is present in and/or moves within an area within a predefined spatial proximity of the one checkout-terminal, sending by the one checkout-terminal a payment request to the server computer, the payment request comprising the read tag information and the terminal-ID of the one checkout-terminal;
  receiving, by the server computer, the payment request from the checkout-terminal;
  verifying, by the server computer, whether a time interval between receiving the terminal-check-in request and the payment request for the same one of the one or more checkout-terminals is below a threshold value; and
  only if the time interval is below the threshold, initializing, by the server computer, a payment transaction for the customer from whose portable telecommunication device the terminal-check-in request was received based on information in the payment request.

According to embodiments, the method comprises emitting, by the plurality of beacons of each of the checkout-terminals, a signal. The emission of the signals enables nearby portable telecommunication devices to receive the emitted beacon signals and use the beacon signals to determine their position.

According to embodiments, the server is configured to repeatedly assign, after a predefined time interval has lapsed, a new check-value to each of the checkout-terminals.

The assignment of a new check-value to a checkout-terminal automatically invalidates the check-value which was previously assigned to said checkout-terminal. The server, the checkout-terminals and the beacons are configured to synchronize the newly assigned check-values such that the beacon signals emitted by the beacons comprise the currently assigned check-values of the checkout-terminal in addition to the terminal-ID of the checkout-terminal to which the beacons are assigned. The server is configured to check whether the check-value specified in a terminal-check-in-request and/or specified in a payment-request is a valid check-value (i.e., is identical to the check-value currently assigned to this checkout-terminal by the server), and not to initialize the payment transaction in case the check-value is invalid.

The checkout-value can be a number, a string or any other data value which is unique for a given checkout-terminal at least while being assigned to a checkout-terminal as the checkout-terminal's current, valid check-value. This method is also referred to as "check-value rotation". According to embodiments, the check-value can be part of the terminal-ID and in this case the repeated assignment of new check-values to the checkout-terminals is referred to as "terminal-ID rotation".

This may increase the security, because in case an attacker should use a check-value known from a previous shopping tour in order to create manipulated terminal-check-in or payment requests, these requests will not be processed by the server as they comprise a meanwhile invalidated check-value.

According to embodiments, the system further comprises the portable telecommunication devices of one or more of the customers.

In a further aspect, the invention relates to a scanning unit for use as a component of a checkout-terminal. The scanning unit comprises a base unit and an insert unit. The insert unit designed as an exchange component which can be repeatedly removed from and re-inserted into the base unit.

According to embodiments, the insert unit comprises one or more item sensors (e.g. optical sensors) or at least a part of an item sensor systems (e.g. an RFID antenna for sending an interrogation signal and/or for receiving a response signals from the RFID tags). The other part of the RFID-based item sensor, the RFID reader, is preferably part of the base unit. Upon insertion of the insert unit into the base unit the embedded data processing system of the base unit is operatively coupled to and enabled to receive data from the one or more item sensors or item sensor parts (RFID antennas) of the insert unit. The base unit may comprise and use the embedded data processing system for overall checkout-terminal control. The scanning unit may be used for reading product tags.

In particular, the product tags can be electronic tags, e.g. RFID tags, and the item sensor can be an RFID system comprising an RFID reader and one or more antennas, whereby the reader is used for generating an interrogation pulse to be emitted via one or more of the antennas used as sender-antennas and whereby said or other ones of the antennas are used for receiving the modulated RFID signals from the product tags. Preferably the RFID reader is integrated into the base unit and the antennas are integrated in the insertion unit.

In addition, or alternatively, the product tags can be optical tags such as bar codes or QR codes and the item sensor can be an optical reader, e.g., a camera, a laser-based optical code reader (e.g. a laser-based QR-code reader or bar-code reader).

Using a scanning unit comprising a base unit and an insert designed as an exchange component may allow providing a scanner unit optimally suited to the size and material of the goods to be scanned and/or to the size and types of product tags attached to the goods, thereby increasing scanning accuracy and scanning speed.

According to embodiments, the scanning unit is implemented as described for the scanning unit used in the hands-free checkout method and system described herein for embodiments of the invention. For example, the scanning unit may comprise a base unit which can be coupled to any one of a plurality of different insert units as described herein and as depicted, for example, in FIGS. 4C, 5C and 8A-F.

According to some examples, the insert unit comprises one or more of the following components, preferably as integral parts of the insert unit:
  light sources (e.g. LEDs),
  item sensors or at least parts of the item sensor systems; for example, the insert unit may comprise optical item sensors for optically reading product tags; in addition, or alternatively, the insert unit can comprise RFID sensor systems or at least parts thereof; For example, an RFID sensor system may comprise an RFID reader configured to emit radio waves through one or more sender-antennas and configured to receive the modulated radio signals emitted by the RFID product tags through one or more receiver-antennas, whereby preferably only the sender- and receiver-antennas are placed in the insert unit and the RFID reader is comprised in the base unit; and/or
  one or more container-presence-sensors (e.g. Ultrasonic and/or TOF sensors); and/or
  a controller for controlling the container-presence-sensor.

Different types, dimensions and relative positions and orientations of the item sensors within the insert unit may be suitable for different types of products and product tags. For example, different types and dimensions of the RFID antennas and RFID antenna arrangements, are suitable for different product ranges. By placing the RFID antennas into the insert unit and designing the insert unit as exchangeable part, the scanning unit and the whole checkout-terminal can be quickly adapted to a product range by replacing the insert unit. The fixed connection of the antennas to the insert unit also ensures that the positioning of the antennas relative to the scanner cavity does not change and that reliable reading results are delivered (e.g. even without recalibration of the reader after assembly). Another advantage is the possibility to install shielding material (esp. on the outside of the antennas) also in the insert unit (e.g., within walls, wall extensions or doors) to avoid exciting and reading RFID tags outside the scanner cavity.

Installing the item sensors (or parts thereof such as the antennas) in the insert unit and thus in the inside of the scanner cavity also ensures that the antennas are close to the tags. This increases the probability that tags will be detected. In addition, the transmitting power of the RFID reader can be reduced, which reduces the probability of reading tags outside the scanner cavity.

Providing the container-presence-sensor(s) and/or the item sensors as integral parts of the insertion unit may have the advantage that installation and maintenance of the insertion unit is facilitated as additional calibration and configuration steps can be omitted: different characteristics of the insert unit (e.g. due to smaller width) may require different positioning of the container presence sensors. In addition, it is crucial for the correct evaluation of the data provided by the sensors and thus the correct detection of the container that the position (incl. tilt angle) of the container-presence-sensors is not changed relative to the scanner cavity. For the same reasons, the orientation and positions of the item sensors or sensor system parts are not changed. This is ensured by integrating the said components into the insert unit.

Cables run between the controller for the container presence sensor and the individual sensors. Providing the controller of the container-presence-sensor as an integral part of the insert unit may have the advantage that the cables running between the said controller and the individual sensors of the container-presence-sensors can be permanently installed and fixed and are not exposed to any mechanical stresses when the insert unit is removed. In addition, this reduces the number of connections required from the insert unit to the base unit, since there only needs to be one connection between the controller of the container-presence-sensor and the embedded data processing system in the base unit. The container-presence-sensor typically consists of a plurality of ultrasound and/or laser-based TOF sensors individually controlled by said controller, whereby the insert unit and the base unit comprise an interface in the form of a reversibly separable cable connecting the container-presence-sensor and the data processing system of the base unit.

According to embodiments, the controller of the container-presence-sensors is designed for a specific number and type of container-presence-sensors. Different combinations of container-presence-sensors therefore require different container-presence-sensor-controllers. By installing the said controller in the insert unit, insert units with different sensor configurations can be used without having to make changes to the base unit.

According to some examples, the base unit comprises one or more of the following components:
  a controller for controlling the light sources, and/or
  one or more item sensors or item sensor parts (e.g. optical code readers and/or RFID sensor system parts, in particular the RFID reader); the RFID reader is a device configured to emit an electromagnetic interrogation pulse through sender-antennas coupled to the RFID reader device, to excite an RFID tag such that the tag transmits digital data, usually an identifying inventory number, back to one or more receiving antennas coupled to the RFID reader device; thereby, depending on the embodiment, the reader may use different antennas for the sending and receiving of the signal or may use the same antenna(s) for both purposes;
  Preferably, the base unit further comprises an embedded data processing system, e.g., a microprocessor or an embedded computer for overall checkout-terminal control (coordination of checkout-terminal components, connectivity to server and beacons, etc.).

Placing the controller of the light sources in the base unit may offer the advantage that this controller can also be used for other illuminated elements (esp. base plate). In addition, this keeps the weight and dimensions of the insert unit low, which ensures easy manageability for maintenance.

According to embodiments, the base unit comprises an RFID reader for emitting an electromagnetic interrogation pulse to excite RIFD tags used as the product tags. The RFID reader can be provided as an integral part of the base unit. This keeps the weight and dimensions of the insert unit low, which ensures easy manageability for maintenance. It also allows easy access to the reader, which is more likely to be subject to defects than passive RFID antennas. As an active electrical device, the RFID reader produces heat. To ensure sufficient air circulation, placement in the base unit is advantageous.

In a further aspect, the invention relates to a checkout-terminal comprising the scanning unit with the base unit and the insert unit designed as exchange component.

According to embodiments, said checkout-terminal further comprises one or more of the following components:
- multiple beacons respectively being a hardware transmitter configured to emit a beacon signal having encoded a terminal-ID of the checkout-terminal;
- a person-presence-sensor configured to determine if a person is present in and/or moves within an area within a predefined spatial proximity of the checkout-terminal;
- a base plate comprising a scanning area and a payment area and one or more light sources operatively coupled to a controller of the checkout-terminal to enable the checkout-terminal to control the operation of the light sources such that a customer is guided to enter the scanning area for causing the person-presence-sensor to determine that the customer is present in the scanning area and to initialize the reading of the tags and/or such that the customer is guided to enter the payment area for causing the person-presence-sensor to determine that the customer has entered the payment area and to initialize the payment of the goods via the sending of a payment request by the checkout-terminal.

In a further aspect, the invention relates to an electronic retail self-checkout system comprising the above-mentioned checkout-terminal. In particular, the electronic retail self-checkout system can be configured to perform the checkout-method described herein for embodiments and examples of the invention. However, the scanning unit and/or the checkout-terminal comprising the scanning unit with the exchangeable insert unit may also be comprised in other types of checkout systems, e.g., in retail checkout systems using a Pin-Pad per default for user authentication or in retail checkout systems using any other type of user authentication method and device, whereby the checkout-terminal can be a self-checkout-terminal, or a conventional checkout-terminal operated by a cashier.

In a further aspect, the invention relates to a scanning unit customization system. The scanning unit customization system comprises the scanning unit described herein for embodiments of the invention and a plurality of further insert units for the scanning unit. Each of the further insert units is designed as an exchange component which can be repeatedly removed from and re-inserted into the base unit.

According to embodiments, the walls of each further insert unit comprise one or more item sensors (or parts of an item sensor system) and/or one or more container-presence sensors, whereby the number, type, position and/or orientation of the item sensors and/or person presence sensors in the further insert units differs from each other. According to some embodiments, one or more of the further insert units have a vertical or horizontal extension of at least one of the walls for improving the shielding and/or comprise one or more automated doors and/or have scanning cavity shapes which differ from each other. The cavity formed by the walls of the different further insert units can have different widths. Each of the further insert units is preferably configured such that upon insertion of the insert unit into the base unit the embedded data processing system is operatively coupled to and enabled to receive data from the components of the insert unit. For example, the embedded data processing system may receive data directly from the container-presence-sensors but more preferably receives data from a container-presence-sensor-controller comprised in the insert unit.

In a further aspect, the invention relates to a method of customizing an electronic retail self-checkout system to the product portfolio of a shop. The method comprises:
- providing a plurality of different insert units of a scanning unit, each insert unit being designed as an exchange component which can be repeatedly removed from and re-inserted into a base unit of a scanning unit of a checkout-terminal, the canyons formed by the walls of the different insert units having different widths;
- determining the type of goods whose product tags are to be scanned in a cavity of the scanning unit; and/or
- determining the type of product tags to be attached to the goods for being scanned;
- selecting one of the plurality of insert units in dependence on the determined type of goods and/or in dependence on the determined type of product tags;
- inserting the selected insert unit into the base unit to provide a scanning unit; and
- using the scanning unit for performing the check-out method according to any one of the embodiments described herein.

According to embodiments, the higher the reflectivity or absorbance of the material of the goods in respect to radio waves, the smaller the width of the canyon formed by the walls of the insert unit; and/or wherein the smaller the size of the tags to be attached to the goods, the smaller the width of the canyon formed by the walls of the insert unit.

In a further aspect, the invention relates to a scanning unit for use in a checkout-terminal. The scanning unit comprises a container-presence-sensor. The container-presence-sensor comprises a combination of:
- one or more ultrasonic sensors directed towards the cavity formed by the walls of the scanning unit; and
- one or more time-of-flight (TOF)-based distance sensors directed towards the cavity formed by the walls of the scanning unit, the one or more TOF-sensors being in particular laser-based TOF sensors.

Said scanning unit can be implemented as monolithic scanning unit or as a scanning unit comprising a base unit and an insert designed as an exchange component.

In a further aspect, the invention relates to a portable telecommunication device of a customer, e.g. a smartphone. The device comprises an interface for receiving beacon signals emitted by beacons of one or more checkout-terminals and comprises a client application.

The client application can be the client application which is interoperable with the server application described herein for embodiments of the hands-free checkout-system. The client application is configured for:
- receiving, via the interface, the beacon signals emitted by beacons of the one or more checkout-terminals, the beacon signals comprising a terminal-ID of the one of the check-out terminals to which they are assigned;
- determining the one of the one or more checkout-terminals being closest to the customer;

determining the distance between the customer and a specified area next to this closest checkout-terminal as a function of the received beacon signals; and upon determining that the distance to the specified area is below a predefined threshold value, automatically generating a terminal-check-in request, the terminal-check-in-request comprising an identifier of the determined nearest checkout-terminal, wherein in particular the distance is determined by using multilateration, in particular by using trilateration; in particular, the distance can be determined by using multilateration, in particular by using trilateration; and sending the terminal-check-in request via a network connection to a server, the terminal-check-in request comprising a terminal-ID of the identified nearest checkout-terminal and a customer-ID. According to embodiments, the terminal-check-in-request is sent to the server for enabling the server to assign the customer identified in the terminal-check-in-request to a payment-request. According to embodiments, the terminal-check-in-request enables the server to assign the customer identified in the terminal-check-in-request to a payment-request for one or more selected goods to be purchased, the payment-request being received by the server from the said checkout-terminal.

According to embodiments, the client application is configured for continuously determining the signal strength of the received beacon signals. The client application is configured to use a trained machine-learning model, e.g. a trained neural network model, for performing the determination of the distance between the customer and the specified area. The trained machine-learning model has been trained on a training data set. The training data set comprises known positions of portable telecommunication devices relative to a specified area next to a checkout-terminal, e.g. the scanning area or the payment area. The known position is annotated with beacon signal strengths measured over a predefined period of time by a plurality of portable telecommunication devices used for generating the training data set. During the said period of time, e.g. several minutes or even hours, users carrying the portable telecommunication devices to generate the training data move around, thereby approaching and moving away from the checkout-terminals. The plurality of portable telecommunication devices used for generating the training data set comprises portable telecommunication devices located in different orientations and/or portable telecommunication devices having different distances to the body of the carrier and/or being surrounded by different types of materials. For example, a smartphone may be carried in different pockets, jacket pockets, backpacks. The strength of a beacon signal may not only depend on the distance between beacon and portable telecommunication device but also on the shielding effect caused by the material of the pockets or backpacks surrounding the portable telecommunication device and on the shielding effect of the human body. Based on this training data set, a machine learning module may "learn" the effects of the position and orientation of the portable telecommunication device relative to the person carrying the portable telecommunication device and of other factors on the beacon signal strength.

This may be beneficial because this type of training data allows generating a trained machine learning model which is able to automatically filter out beacon signal strength variations which are caused by variations of the orientation of the portable telecommunication device in a bag or jacket of the carrier, by variations of the position of the portable telecommunication device relative to the carrier and the ground and/or by the type of materials surrounding or shielding the portable telecommunication device, e.g. the materials of the pockets or bags or the materials of the varying number of objects which may be located between a beacon an the portable telecommunication device and which may shield the beacon signals. Thereby, the position determination can be greatly increased also in a "real world" shopping scenario where the signal strength received by the portable telecommunication device may depend on all said factors and not only on the distance to the beacon.

The client application may be configured to create a session for the customer in response to a successful authentication of the customer at the client application as described above.

A "scanning unit" as used herein is a device or module for use as a component of a checkout-terminal. The scanning unit comprising one or more item sensors for reading information encoded in product tags attached to products inserted into or laced at a predefined position relative to the scanning unit. For example, the scanning unit can comprise an RFID system configured for reading electromagnetic radiation emitted by electronic tags comprised within a cavity of the scanning unit. For example, the scanning unit can be an RFID scanning unit. Radio-frequency identification (RFID) uses electromagnetic fields to automatically identify and track tags attached to objects. An RFID tag is a tiny radio transponder. A RFID-based scanning unit may comprise one or more radio receivers and one or more radio transmitters. When triggered by an electromagnetic interrogation pulse from a transmitter, the tag transmits digital data, usually an identifying inventory number and/or price information, back to the reader. This number can be used to scan goods. The RFID tag can be active tags, but typically they are passive tags. In addition, or alternatively, the item sensors can be optical sensors for optically reading product tags (bar codes, QR codes) attached to goods positioned within or in a predefined spatial proximity to the cavity of the scanning unit.

An "area next to an object" can mean an area within a predefined maximum distance from said object or an area at a predefined position relative to said object.

An "item sensor" as used herein is a sensor or a set of sensors or sensor systems for scanning the product tags. For example, an item sensor can be an optical sensor such as a laser-based QR-code reader or a bar code reader. The item sensor can also be an RFID-system comprising an RFID reader device also referred to as "RFID reader".

An "RFID reader" as used herein is a device configured for emitting an electromagnetic interrogation pulse via one or more sender-antennas. The interrogation pulse causes RFID tags excited by the interrogation signal to emit a modulated response signal. The RFID reader is configured to receive the response signal emitted by the one or more excited RFID tags via one or more receiver-antennas. According to some embodiments, the antennas in the scanning unit are used by the RFID reader both as sender-antennas and as receiver-antennas. According to other embodiments, the scanning unit comprises one or more antennas solely used by the RFID reader as sender-antennas and comprises one or more antennas solely used by the RFID reader as receiver-antennas.

A "person-presence-sensor" as used herein is a sensor or a combination of multiple sensors adapted to detect the presence of one or more persons in a defined area, e.g. the scanning area and/or the payment area of a checkout-terminal. The person-presence-sensor can be part of a person-sensor-system comprising one or more person-presence-sensors and one or more additional components such as microcontrollers or other types of data processing units.

A "container-presence-sensor" as used herein is a sensor or a combination of multiple sensors adapted to detect the position and/or size of an object, e.g., a container, within the cavity of a scanning unit.

A "checkout terminal" as used herein is a terminal which enables a customer to perform one or more steps of a checkout-process for initiating the payment of one or more goods. A terminal is in particular an electronic or electromechanical hardware device that can be used for entering and/or outputting data.

A "server computer" as used herein is a monolithic or distributed computer system connected via a network, e.g. the internet, to one or more checkout-terminals and portable telecommunication devices of one or more customers.

A "terminal-check-in request" as use herein is a request to initiate a tag scanning and payment process by a particular checkout-terminal for a particular customer. This request is not to be confused with a system-check-in request for authenticating a customer who wants to start shopping in a particular shop: while the system-check-in request is submitted before or at the beginning of the shopping, the terminal-check-in request is submitted when the user has put all desired goods into the container and now wants to pay for these goods at a particular checkout-terminal. So the submission of the terminal-check-in request is created at the begin of the checkout process.

A "portable telecommunication device" or "portable device" as used herein is any portable electronic device adapted to exchange data via a wireless network, e.g. a mobile phone network and/or a WLAN network. For example, a portable device can be a mobile phone, in particular a smartphone.

A "customer" as used herein is a natural person. For example, the customer can be a person having registered at the server computer in order to be able to use the checkout-method described herein at a particular shop or at a plurality of different shops owned by the same or by different companies. Typically, the registration is performed only a single time for creating an account for the customer which is associated with a payment source.

A "payment source" as used herein is any form of asset which is accepted as a means of payment. For example, a payment source can be a bank account, a credit card, a prepaid card, a prepaid amount of money, a virtual credit card, or a digital representation thereof.

A "container" as used herein is an object shaped and configured for transporting goods. A container can be, for example, a shopping bag, a bag, a basket, a shopping cart, a box, a carton, a backpack or the like. The container can be a multi-use container or a single-use container. The container can be a container owned by the shop and provided by the shop permanently or temporarily to the customer. In other examples, the container is owned by the customer and is brought by the customer to the shop.

A "beacon" as used herein is a hardware transmitter configured to broadcast a signal to nearby portable telecommunication devices for enabling the portable telecommunication devices to determine their position based on the signals.

A "base unit" as used herein is a monolithic or composite component designed to be (mechanically and typically also communicatively) connected to one or more other components in such a way that the totality of the components so connected forms a functional unit.

An "insert unit" as used herein is a part of an object which can be replaceably inserted into and can be removed from the rest of the object.

The expression "computer system" as used herein is a machine or a set of machines that can be instructed to carry out sequences of arithmetic or logical operations automatically via computer programming. Modern computers have the ability to follow generalized sets of operations, called "programs", "software programs", "application" or "software applications". These programs enable computers to perform a wide range of tasks. According to some embodiments, a computer system includes hardware (in particularly, one or more CPUs and memory), an operating system (main software), and additional software programs and/or peripheral equipment. The computer system can also be a group of computers that are connected and work together, in particular a computer network or computer cluster, e.g., a cloud computer system. Hence, a "computer system" as used herein can refer to a monolithic, standard computer system, e.g., a single server computer, or a network of computers, e.g., a clout computer system. In other words, one or more computerized devices, computer systems, controllers or processors can be programmed and/or configured to operate as explained herein to carry out different embodiments of the invention.

The embodiments and examples described herein are to be understood as illustrative examples of the invention. Further embodiments of the invention are envisaged. Although the invention has been described by way of example to a specific combination and distribution of software programs and computer systems, it is to be understood that any feature described in relation to any one embodiment may be used alone, or in combination with other features described, and may also be used in combination with one or more features of any other of the embodiments, or any combination of any other of the embodiments as long as these features are not mutually exclusive.

Accordingly, some embodiments of the present application are directed to a computer program product, e.g. a volatile or non-volatile storage medium or a set of storage media comprising computer-interpretable instructions which, when executed by a processor, cause the processor to perform the steps executed by the server computer, or by the portable telecommunication device, or by the scanning unit, or by the controller of the checkout-terminal, or two or more of the aforementioned devices. Other embodiments of the present application include a corresponding software programs to perform any of the method embodiment steps and operations summarized above and disclosed in detail below.

Any software program described herein can be implemented as a single software application or as a distributed multi-module software application. The software program or programs described herein, e.g. the server application on the server computer or the client application on the portable telecommunication device may be carried by one or more carriers. A carrier may be a signal, a communications channel, a non-transitory medium, or a computer readable medium amongst other examples. A computer readable medium may be: a tape; a disc for example a CD or DVD; a hard disc; an electronic memory; or any other suitable data storage medium. The electronic memory may be a ROM, a RAM, Flash memory or any other suitable electronic memory device whether volatile or non-volatile.

Each of the different features, techniques, configurations, etc. discussed herein can be executed independently or in combination and via a single software process on in a combination of processes, such as in client/server configuration.

It is to be understood that the features described herein for a system or system component implicitly disclose steps or features of a corresponding method and vice versa. Accordingly, the operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

BRIEF DESCRIPTION OF THE DRAWINGS

In the following embodiments of the invention are explained in greater detail, by way of example only, making reference to the drawings in which.

DETAILED DESCRIPTION

Figure 1:
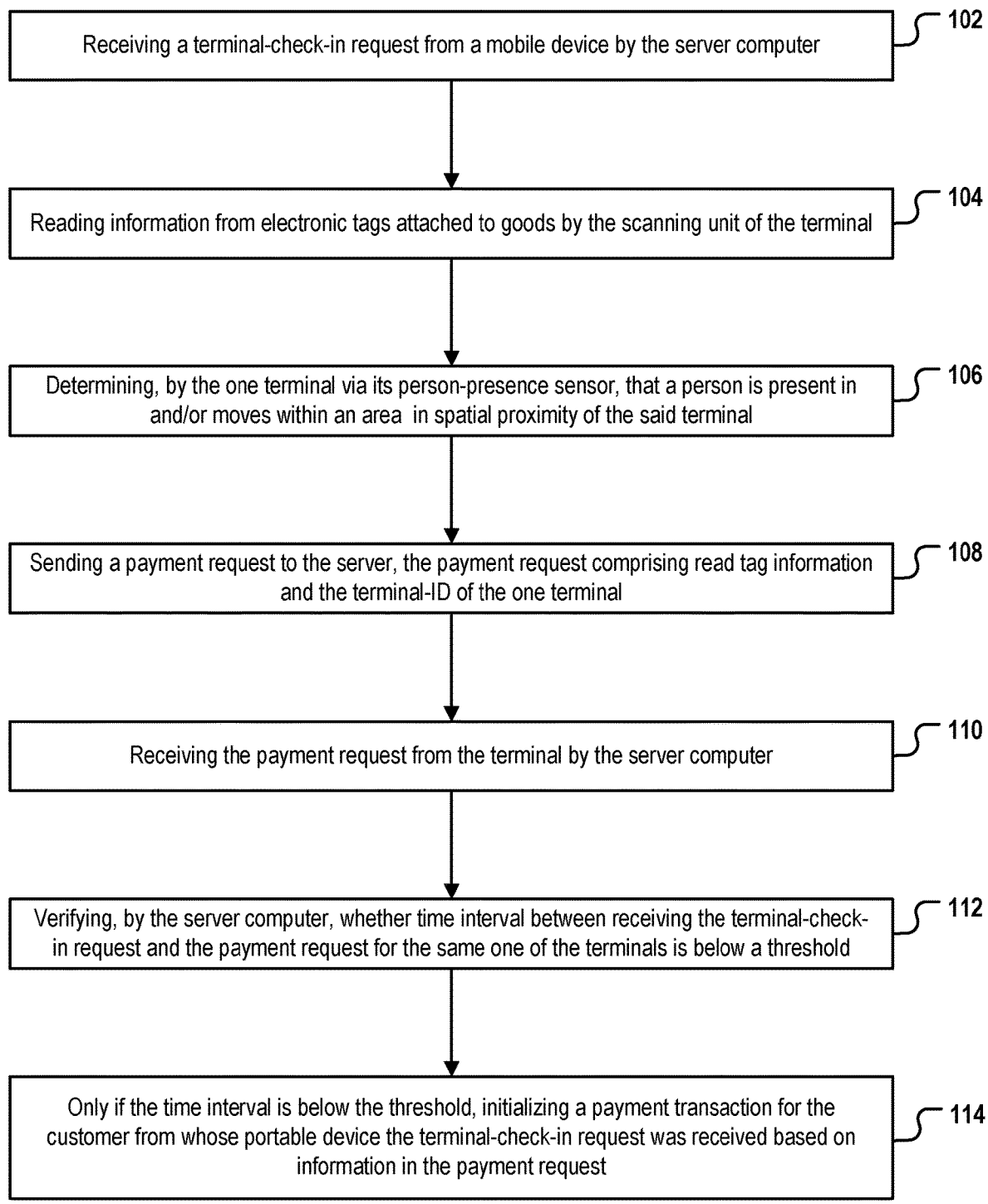
FIG. 1 is a flowchart of a check-out method.
Figure 6:
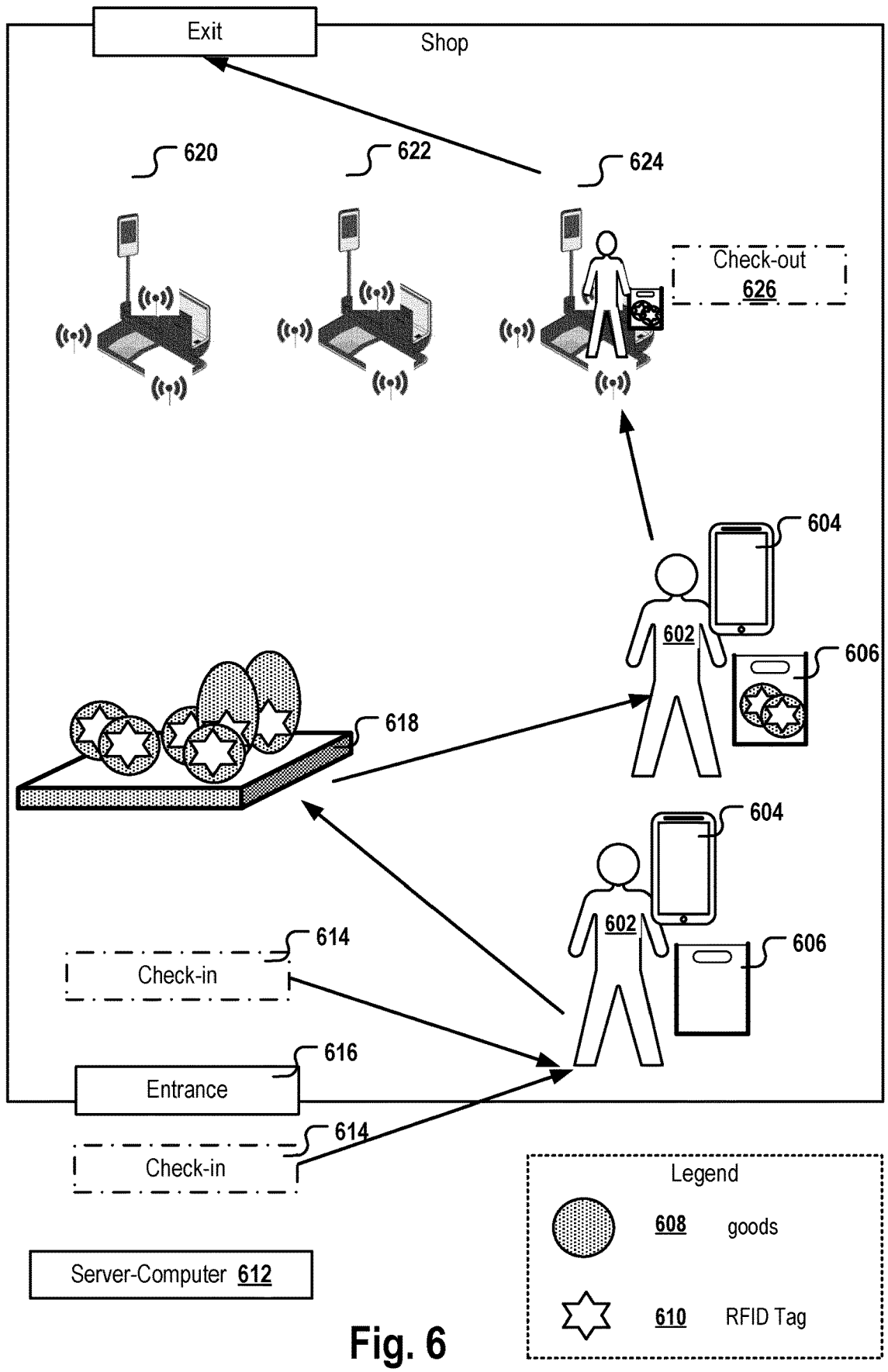
FIG. 6 illustrates a shopping process in a store using an electronic retail self-checkout system.
Figure 7A:
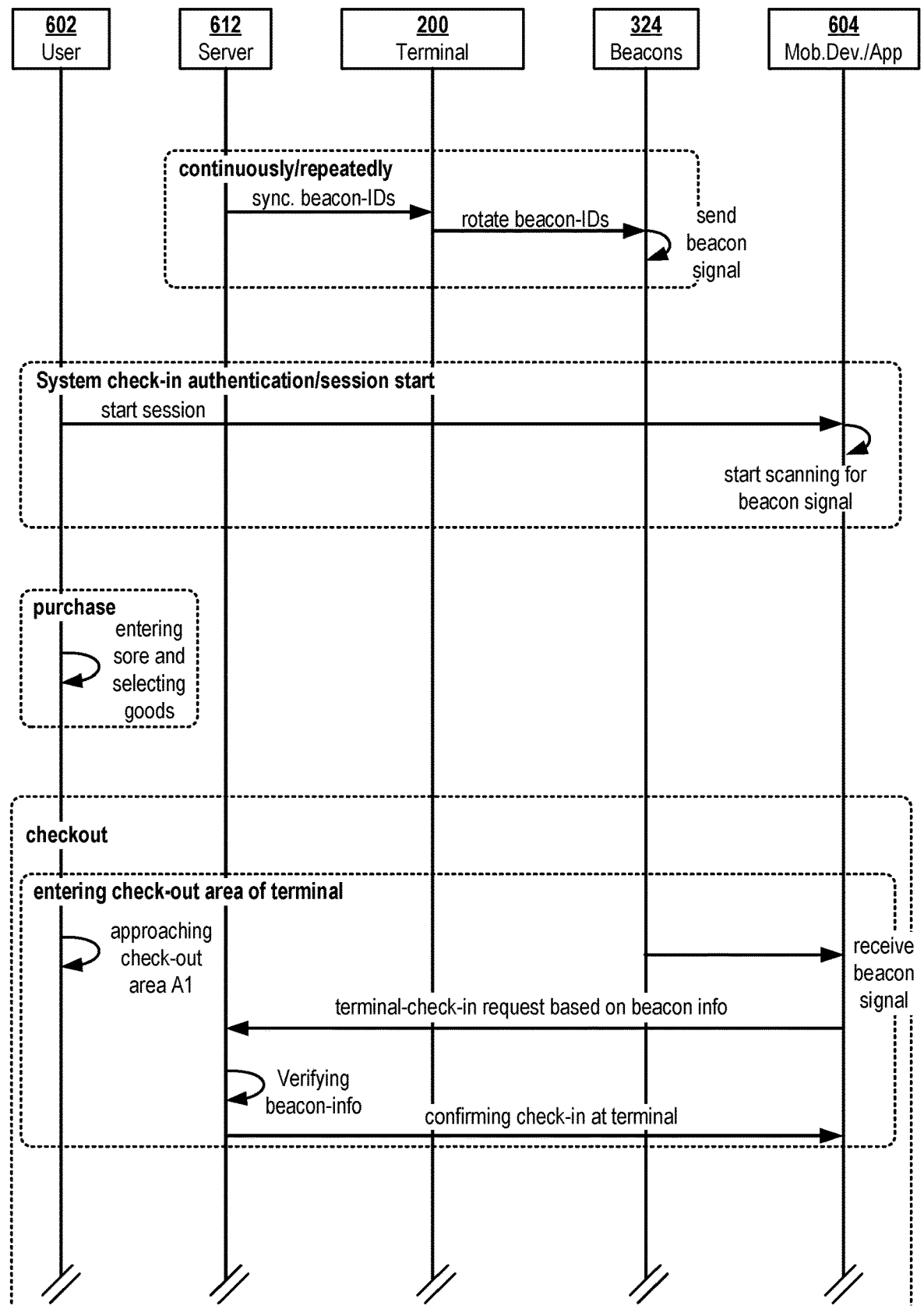
FIG. 7 illustrates the data exchange between different entities involved in the check-in and check-out process.
Figure 7B:
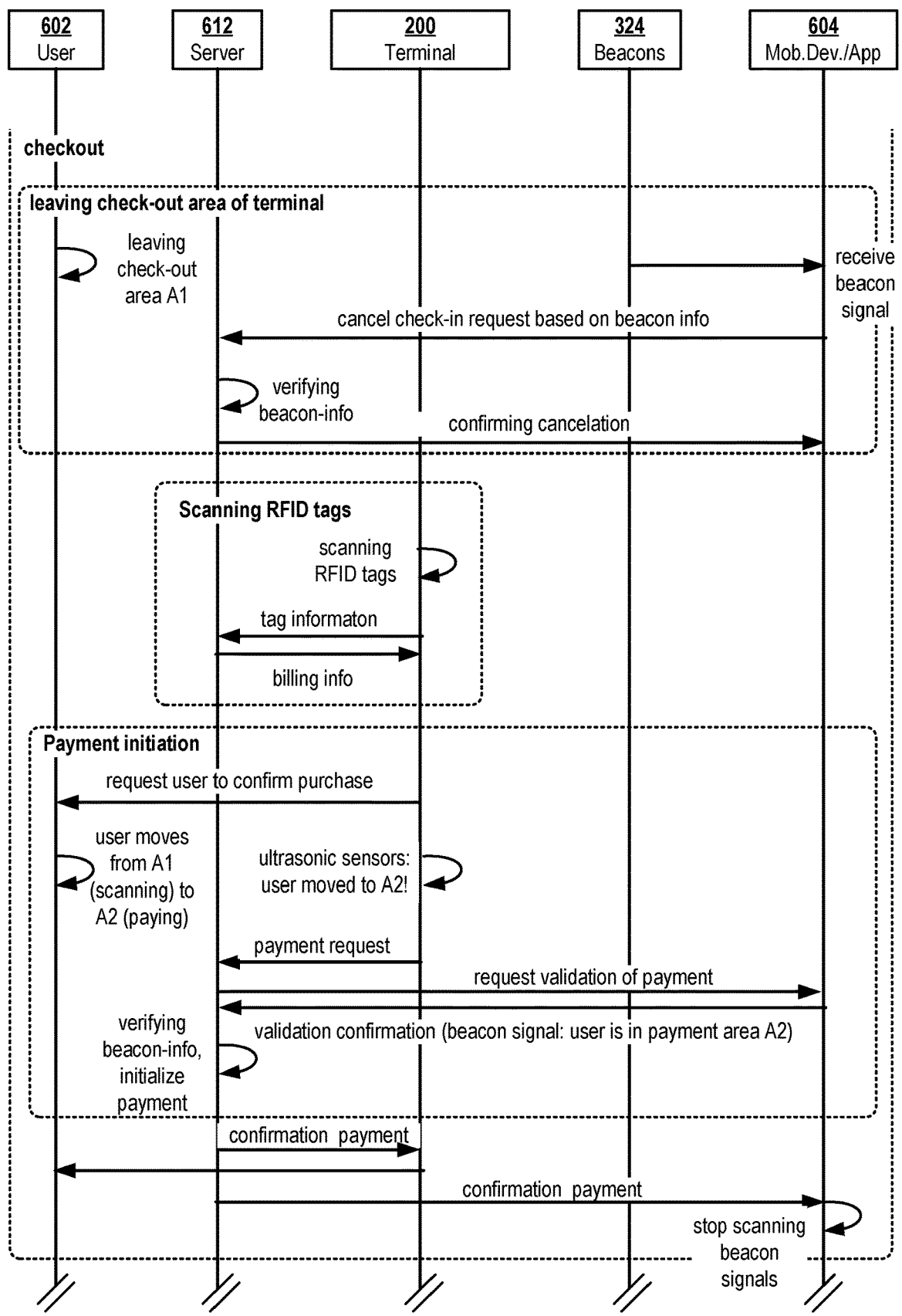

FIG. 1 is a flowchart of several steps in a method that is implemented in an electronic retail self-checkout system and that is designed to make the shopping process, and in particular the payment process, fast, intuitive and theft-proof. An exemplary flow of the entire purchasing process, including the exchange of various data between the participating entities, is shown in FIG. 7. The process illustrated in FIGS. 1 and 7 can be carried out, for example, with the aid of checkout-terminals such as those shown in FIG. 2-5, or by a system including several of these checkout-terminals, as illustrated for example in FIG. 6.

Thus, FIG. 1 illustrates steps that are performed after the customer has already placed several goods in his shopping basket or other shopping container and when the customer tries to initiate the payment process for the selected products.

First, the customer approaches a checkout-terminal with his filled shopping basket. The customer has a portable telecommunication device, e.g. a smartphone, where an application program, also referred to as a client program, is installed. The client program is interoperable with a server application program on a server computer system. Before making a purchase, the customer has already authenticated himself to this client application and thereby released his account for the planned purchase, possibly limited to a certain maximum purchase amount.

The portable telecommunication device has an interface for near-field communication, for example a Bluetooth interface. Via the Bluetooth interface, the client application of the portable telecommunication device continuously receives signals emitted by a plurality of beacons in the vicinity of each of the checkout-terminals present in the store. The client application is configured to continuously perform multilateration, e.g., triangulation, based on the received bacon signals to determine the current position of the customer relative to all checkout-terminals within the beacon signal range. Once the client application determines that the user has come sufficiently close to one of the checkout-terminals, the client application automatically sends a terminal-check-in request to the server application. This request includes a customer ID or other identifier that directly or indirectly identifies an account or prepaid amount that has already been approved by the customer for payment of the purchase price. In addition, the request includes information that identifies the checkout-terminal that is closest to the customer. For example, the client application may be configured to trigger the sending of the request only when the customer is in close proximity to a predefined area next to that checkout-terminal, for example, when the customer is standing on the scanning area 210 of the checkout-terminal to hold his shopping bag in the scanner unit.

In step 102, the server application receives the terminal-check-in request from the customer over a network. For example, the request can be transmitted over a cellular connection. If the store has a WLAN connection, the request can also be sent to the server over the WLAN.

In step 104, the scanner unit of the checkout-terminal reads the electronic labels and/or optical labels of all the goods that are in the customer's shopping bag (or which are placed next to an opening of the scanning unit so that the optical reader can read the optical product tags). For example, the product labels may contain an inventory number or other product-related information, such as name and/or price. This information is read by the scanning unit during the reading process. In order for step 104 to be executed, further preparation or verification steps may be required depending on the implementation variant of the checkout-terminal. For example, the scanner unit may include a container-presence-sensor that continuously monitors the size and position of the shopping bag in the scanner unit and automatically initiates the scanning process once the shopping bag has been completely inserted into the scanner unit. If necessary, the scanning process is paused or aborted if the shopping bag leaves the scanner unit completely or partially during the scan. It is possible, according to some implementation examples, for steps two and 104 to be performed in different orders or in parallel.

In step 106, a person-presence-sensor of the checkout-terminal, which may include, for example, an array of ultrasonic sensors, determines that a person is in close physical proximity to the checkout-terminal. In some implementation embodiments, this step comprises detecting, by the person-presence-sensor, if and when a person exits a first area 210 adjacent to the checkout-terminal, referred to herein as the scanner area, and enters a second area 212, referred to herein as the payment area.

The checkout-terminal then generates a payment request that includes an identifier of the checkout-terminal and payment information. This includes, for example, a list of all goods recently scanned by the scanner unit and, optionally, the total price of those goods. Since the checkout-terminal preferably does not know the identity of the customer, the payment request does not contain any information about the identity of the customer. This payment request is sent from the checkout-terminal to the server computer in step 108.

According to implementation variants, steps 106 and 108 are performed asynchronously to and independently of the generating, sending, and receiving of the terminal check-in request. Thus, there is typically no exchange of data between the customer's portable telecommunication device and the checkout-terminal for the purpose of synchronizing the two requests. Rather, the generation and sending of the two requests is performed asynchronously by the customer's portable telecommunication device and by the checkout-terminal, respectively, and it is the task of the server application to assign the payment requests that the server receives from the one or more checkout-terminals to exactly those customers from whose portable telecommunication devices a terminal-check-in request regarding that very checkout-terminal was received in close temporal proximity. The assignment of these two requests based on their temporal proximity of receipt by the server is done in step 112.

Only if the server succeeds in assigning a terminal-check-in request to the payment request of the checkout-terminal, preferably based on a maximum allowable time interval between receiving the two requests of a few seconds, the server assigns the payment request to this customer and debits the purchase price from this customer's account.

Figure 2:
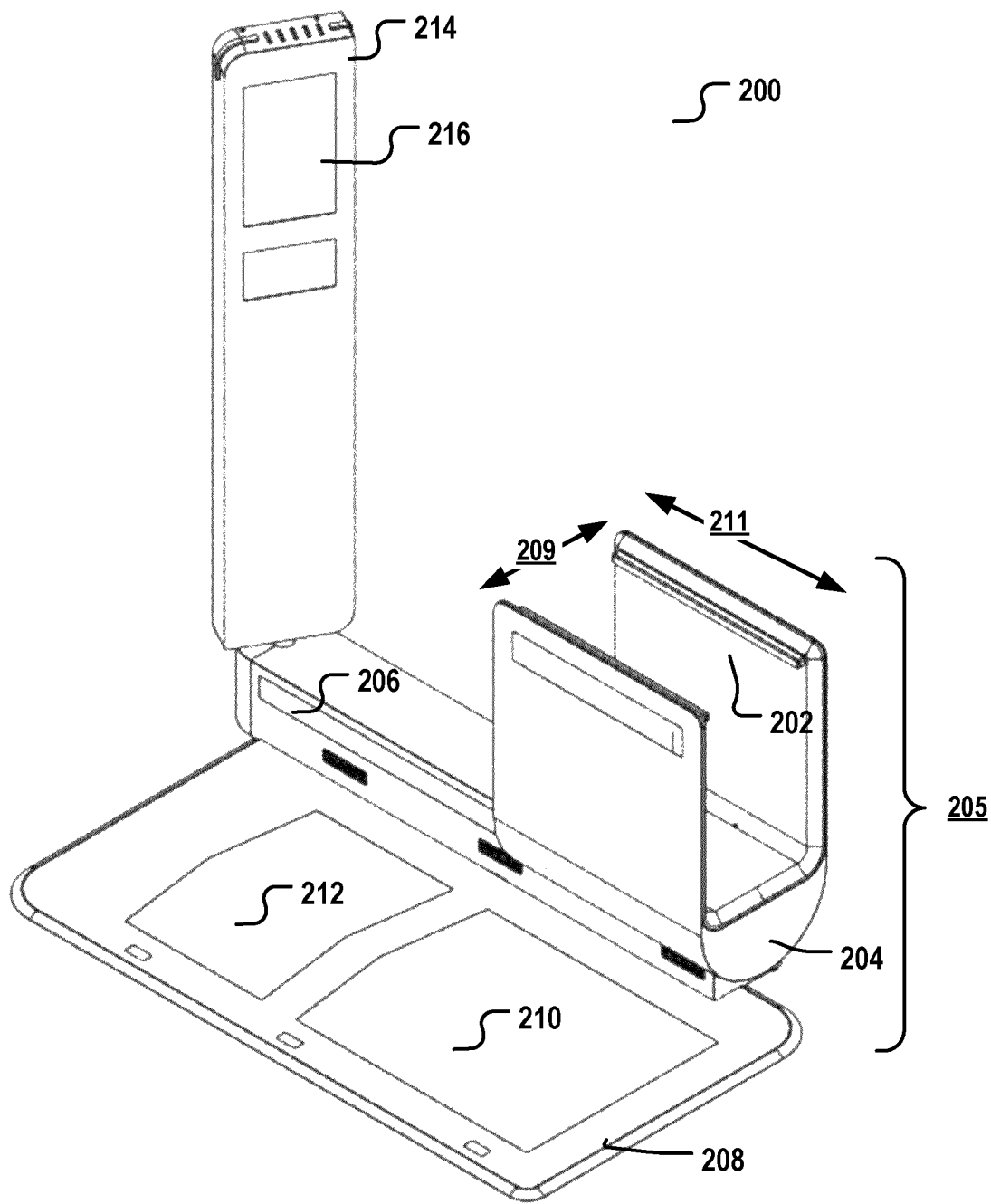
FIG. 2 is an illustration of a checkout-terminal.

FIG. 2 is an illustration of a checkout-terminal 200 according to one implementation variant. The checkout-terminal comprises a scanner unit 205 and a base plate 208. Optionally, the checkout-terminal may additionally comprise a display element 214 with a digital display 216, for example an LCD screen.

The scanner unit may comprise, for example, a base unit 204 and a replaceable insert (or "insert unit") 202. The scanner unit 205 includes a cavity, preferably in the form of a canyon, so that a customer can insert his shopping container into and remove it from the cavity of the scanner without having to lift the container for this purpose. The width of the canyon formed by the walls of the insert unit of the scanner unit is indicated by the double arrow 209.

The base plate 208 may be mechanically coupled to the scanner unit 205, for example. The base plate can include two separately identified areas: the scanner area 210 allows a customer to enter this area while inserting the container with the goods to be paid into the cavity of the scanner unit. The areas 210, 212 are typically positioned relative to each other such that a person standing on the area 210 can enter the area 212 in one step or a few steps, thereby triggering the payment of the scanned goods. The base plate is an optional component. In other embodiments, the beacons and/or the light sources can be attached to other parts of the checkout-terminal and/or can be attached to other objects within the room or to the walls or the ceiling of the room in which the checkout-terminal is installed. The areas can be surface areas of the floor of the shop highlighted by a beamer or other light source or can be an area which is only highlighted by means of a sticker, a particular color or an imprint.

Preferably, different colored light sources are used which are controlled by a controller located in the base unit to assist the customer in scanning and paying for the selected goods. In this case, the base plate 208 and the scanner unit 205 may also have interfaces that can be reversibly coupled to each other for data exchange. For example, a wired interface or a near-field communication interface such as Bluetooth may be used.

The sensor unit may include an elongated, ground-level module 206, referred to herein as a sensor rail. The module 206 may be part of or coupled to the base element of the scanner unit. Along the sensor rail, for example, one or more person-presence-sensors may be included that are oriented and configured to detect whether one or more persons stand on the scanner area 210 and/or on the payment area 212. For example, these sensors may be ultrasonic sensors. According to other embodiments, it is also possible that the person-presence-sensors are part of the plate and are configured, for example, as pressure sensors that are installed below the two areas 210, 212. In this case the two areas 210, 212 may be designed and installed as movable and/or elastic elements within the base plate, so that these elements completely or partially are lowered when a person steps on them, which can be detected by the pressure sensors.

The person-presence-sensors thus enable a very rapid and reliable determination of whether and, if so, how many persons are currently standing on the areas 210 or 212, without the need for a time-consuming authentication step of a person with respect to the checkout-terminal.

According to some implementation variants, the base unit 204 contains a controller to control the antenna(s) that emit the radio signal to excite the RFID tags. In addition, the base unit can comprise an RFID reader configured to receive radio signals emitted by the RFID tags attached to the products. The antennas that emit the radio signal to excite the RFID tags are comprised in the insert unit and are connected to the controller (e.g.) via separable cable connections. The dimensions of the insert can be adapted to physical characteristics of a store's product assortment.

Figure 3:
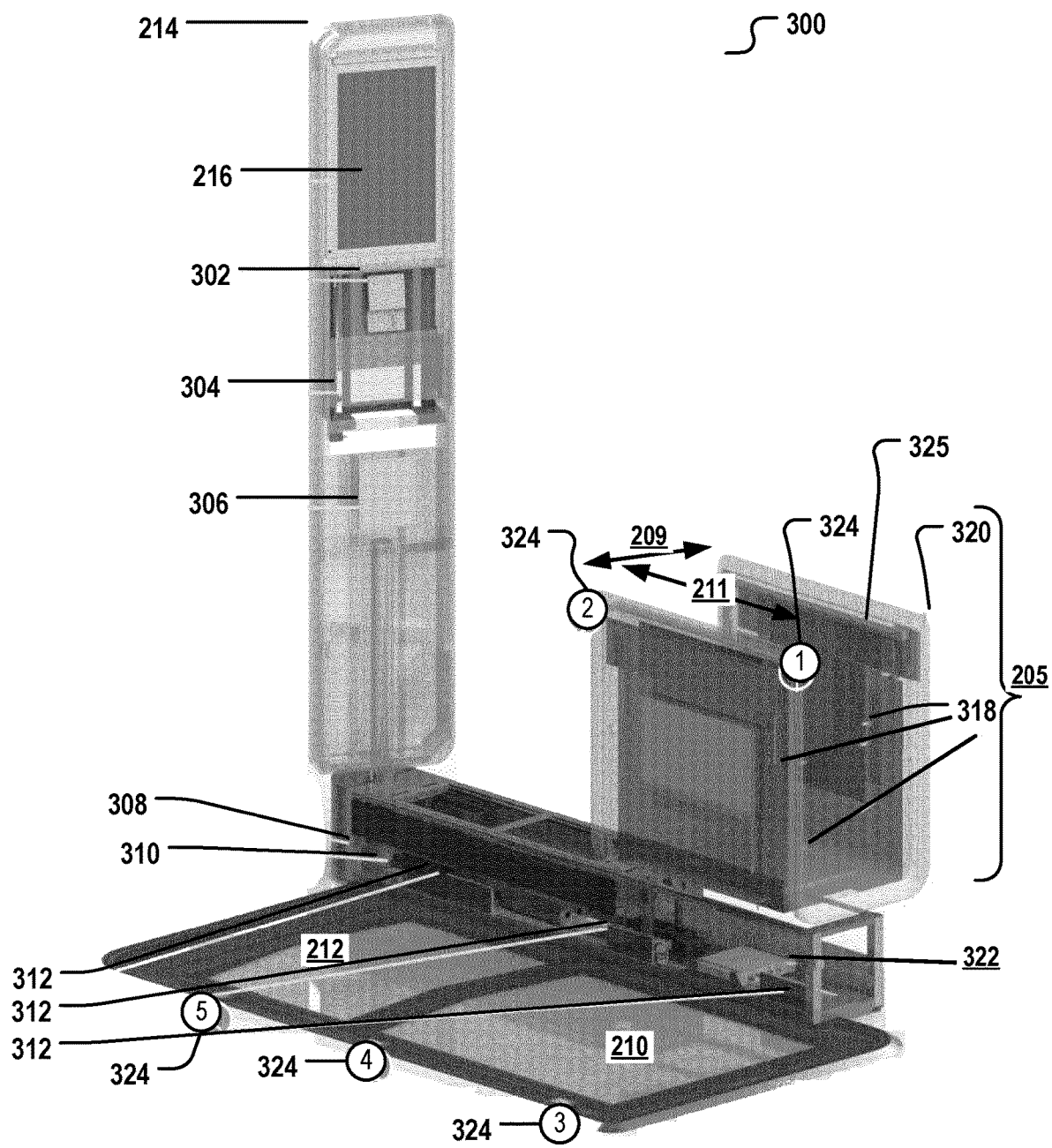
FIG. 3 is a more detailed illustration of a checkout-terminal.

FIG. 3 is a more detailed illustration of a checkout-terminal 300 according to a further implementation variant.

The checkout-terminal 300 includes a scanner unit 205, a base plate with a scanner area 210 and a payment area 212. Optionally, the checkout-terminal further comprises a display element 214 with a digital display 216. In addition to the LCD screen, other LEDs may also be present in the display element, for example LEDs that flash and/or turn red to indicate a problem that occurred during scanning or payment process.

According to some implementation variants, the display element 214 may further comprise a card terminal 302 having a PIN pad that is configured to be foldable. For example, the PIN pad may typically (per default) be in a folded state and hidden behind a cover 304. When the method performed by the electronic retail self-checkout system described herein according to some embodiments of the invention is performed, the card terminal 302 is not required, because no personal authentication of the customer at the checkout-terminal is required to ensure a fast payment process. The fact that the card terminal is normally closed/hidden has the advantage of consuming less space and avoiding the risk of damage to the card terminal or the risk of injury to a person. Only in the event that, for whatever reason, the described payment procedure cannot be carried out, the card terminal 302 is available as a further option for initiating the payment. Preferably, the card terminal 302 includes an NFC module for contactless payment.

Checkout-terminals with the card terminal as an additional payment option may have the advantage that operators of a store can use the new checkout-terminal in their store at an early stage when most of their customers do not have installed the application program required for beacon-signal based position determination yet. Initially, the customers may only use the scanning functionality in combination with the card-terminal and the PIN-based authentication procedure at the checkout. At a later point in time, when the app required to perform location determination is sufficiently widespread among the store operator's customers, it is then possible to switch to the new and faster procedure without the need for hardware retrofitting. According to some embodiments, the optional and foldable card terminal may even be activated on a per-customer basis, thereby enabling a fast check-out procedure for customers having already installed the required app, and also enabling a "fallback" check-out and payment option with conventional speed for customers not yet having installed the app on their smartphones.

In the implementation variant shown in FIG. 3, the scanner unit 205 includes three RIFID antennas 318, namely one on each side wall and another in the bottom of the scanner unit. The three antennas are configured to excite the RFID tags attached to the products by radio radiation. The base unit of the scanner unit incorporates an RFID reader configured to receive and analyze the radio signals emitted or modulated by the RFID tags in response to excitation by the antennas 318. The analysis is performed to identify the goods the customer has placed in his shopping container.

The base unit, and in particular the sensor rail, may include various devices and modules for controlling components of the checkout-terminal. For example, the RFID reader 322 and/or the person-presence-sensors 312 may be coupled to a data processing device integrated in the base unit of the checkout-terminal. The data processing device may be, for example, a microcontroller or a standard computer, and may be configured to analyze the radio signals captured by the RFID reader and/or ultrasonic or optical signals captured by the person-presence-sensors and/or container-presence-sensors. For example, the analysis may be performed to determine the products encoded in the RFID tags, and/or to determine the number and exact position of one or more persons in the vicinity of the checkout-terminal. This computer may also serve as a controller of multiple light sources in the base unit and orchestrate the activity of the light sources to assist the user in the shopping process.

According to some implementation examples, the scanner unit 205 may include one or more container-presence-sensors 325 for determining if and where a container, e.g. a shopping bag, is comprised in the cavity of the scanning unit and/or comprises various light sources to assist the customer in the scanning process. For example, a warning light may illuminate if the shopping bag has completely or partially left the scanning canyon.

According to an implementation variant, the scanning unit 205 comprises a base unit 204 and an insert unit 208, the insert 208 comprising: the antennas 312, canyon walls made of a material that strongly reflects or absorbs radio signals (shielding effect to ensure that no goods are scanned outside the scanner), and several container-presence-sensors, in particular ultrasonic sensors and laser-based TOF sensors. The RFID reader 322, the controller(s) and the data processing unit, however, are preferably part of the base unit.

According to the implementation variant illustrated in FIG. 3, multiple beacons 324 are attached to different portions of the checkout-terminal. For example, in the example shown, three beacons are attached to different portions of the base unit and two additional beacons are attached to two corners of the scanner unit 205. Depending on the implementation variant, the beacons may be integral components of the checkout-terminal 300 or may be elements that can be reversibly coupled to specific areas of the checkout-terminal.

The beacons may be communicatively coupled to the data processing unit of the checkout-terminal 300. For example, the beacons can exchange data with the data processing unit based on a wired or wireless data communication link.

According to other implementation variants of the checkout-terminal, e.g. according to the checkout-terminal shown in FIG. 2, the beacons are not an integral part of the checkout-terminal, but are installed in spatial proximity to the checkout-terminal without being directly physically connected to the base plate or any other component of the checkout-terminal.

Figure 4:
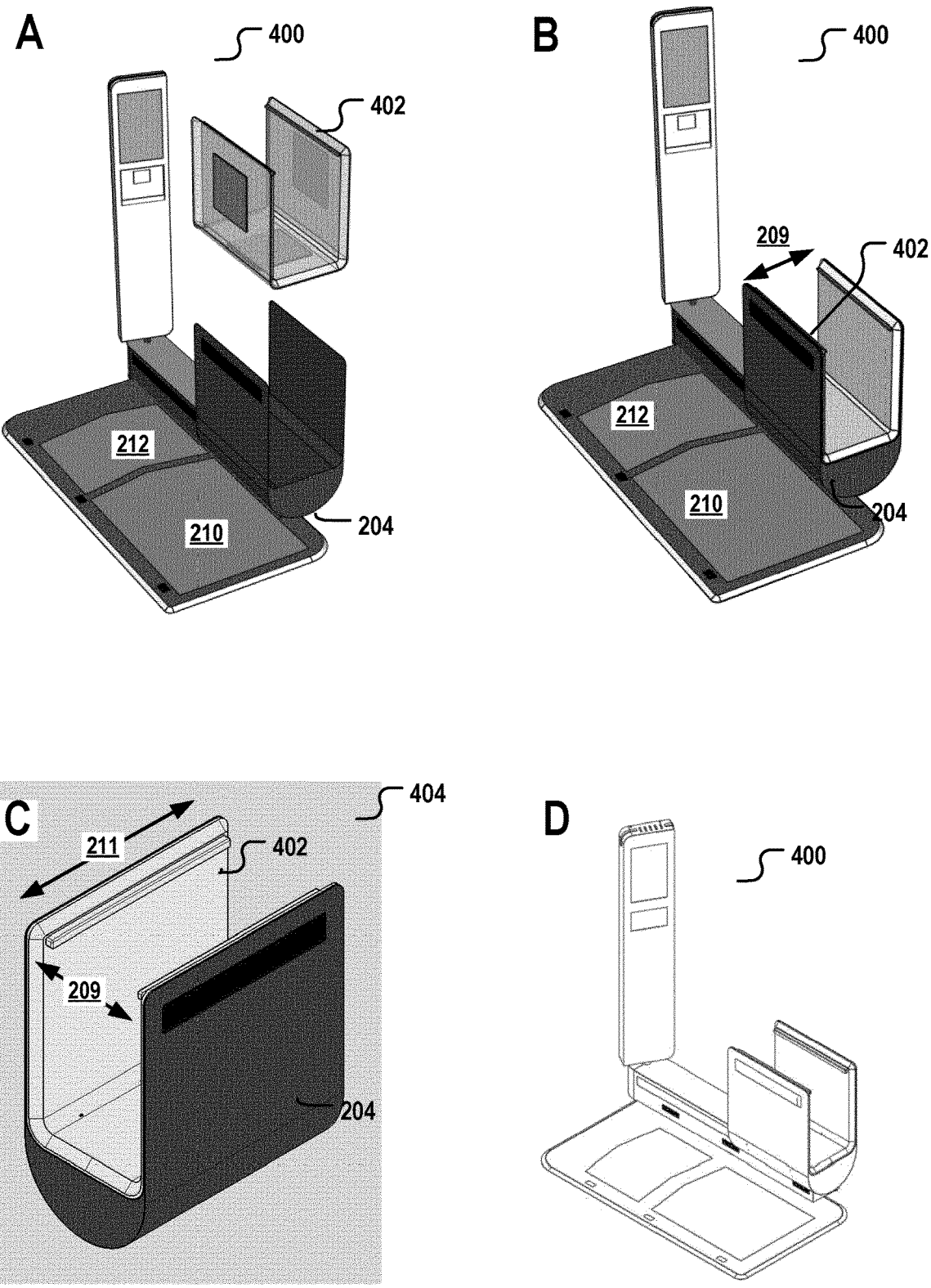
FIG. 4 depicts a checkout-terminal with an insert unit adapted to scan large tags attached to a first class of goods.

FIG. 4 shows a checkout-terminal variant 400 according to which the scanner unit 205 comprises a base unit 204 and an insert 402, the insert having a U-shaped cross-section with a large width 209 of the valley formed by the insert. The insert 402 is optimal for detecting products whose size allows attaching large electronic labels with large antennas and/or products made of materials that allow radio beams to pass largely unaffected. Textiles are an example of this class of product. To be more particular, FIG. 4A shows the insertion of an insert unit optimized for the scanning of product tags attached to textiles into a base unit 204 of a checkout-terminal, FIGS. 4B and 4D respectively show the checkout-terminal 400 after insertion of the insert unit into the base unit, and FIG. 4C shows the scanning unit consisting of the base unit 204 and the insert unit 402.

Figure 5:
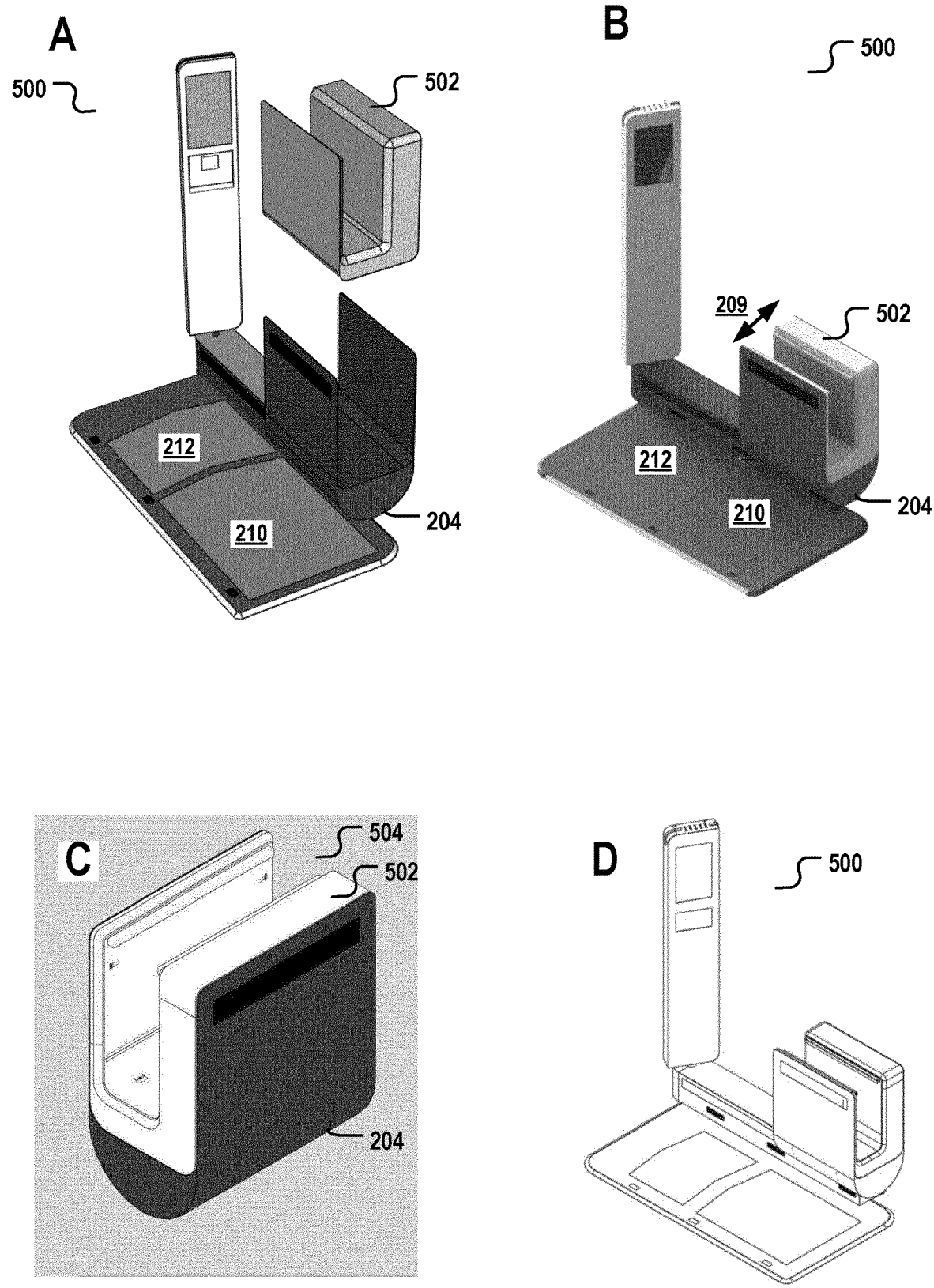
FIG. 5 depicts a checkout-terminal with an insert unit adapted to scan small tags attached to a second class of goods.

FIG. 5, on the other hand, shows a checkout-terminal 500 with a scanner unit that also comprises a base unit 204 and an insert 502. The insert 502 is optimal for detecting products whose small size only allows the attachment of small electronic tags with small antennas and/or products made of materials that may significantly interfere with the passage of radio beams by absorption and/or reflection. An example of this class of products are cosmetics.

To be more particular, FIG. 5A shows the insertion of an insert unit 504 optimized for the scanning of product tags attached to cosmetics into a base unit 204 of a checkout-terminal, FIGS. 5B and 5D respectively show the checkout-terminal 500 after insertion of the insert unit into the base unit, and FIG. 5C shows the scanning unit consisting of the base unit 204 and the insert unit 502. FIG. 6 illustrates a complete shopping process in which a fast and secure check-out procedure is used. FIG. 7 illustrates the data flow between participants in the process and between components of the electronic retail self-checkout system. To avoid repetition, FIGS. 6 and 7 are explained together below.

For example, the owner of a store may have equipped his store with multiple checkout-terminals 620, 622 and 624. Each of these checkout-terminals may one of the checkout-terminals described, for example, with respect to FIG. 1-5 or other implementation variations mentioned in this application document. All of the checkout-terminals may be installed in close proximity to each other, for example, in a checkout area, or may be located at different locations in the store.

For a customer 602 to use the checkout method or one of the checkout-terminals 620-624, he or she must first register once with a server computer 612 and download and install a client program on his or her portable telecommunication device 604, typically a smartphone. The client program is typically a software program, called an app, that is interoperable with a server program of the server computer 612. In the client program and/or in the server program, a customer account is created during the registration process. This customer account is associated with a payment source, e.g., a bank account, a prepaid amount of money, a credit card account, or other type of monetary resource. In addition, authentication data specific to that customer is determined and stored during the registration process. The authentication data can be, for example, a password, a PIN, biometric data, cryptographic keys, hardware token data, or the like, or a combination of several of these types of data.

After the customer 602 has successfully registered, the customer 602 can use the hands-free checkout method described herein at all stores in which the corresponding type of checkout-terminals is installed. Said checkout-terminals are placed in the store in spatial proximity to several beacons, which permanently emit a so-called beacon signal. The beacon signal enables the client app on a customer's smartphone to determine its own position relative to the checkout-terminal(s). Preferably, the checkout-terminals, the server program on the server computer 612, and the beacons installed in the vicinity of the checkout-terminals are configured to constantly synchronize in the background the check-values which are broadcasted by the beacons in addition to the terminal-ID via their beacon signals.

For example, new valid check-values may regularly be created and assigned by the server program to each checkout-terminal in the shop. The server program sends the newly assigned check-value via a network connection, e.g., the internet, to the respective checkout-terminals. Each checkout-terminal sends its current, valid check-value received from the server to all beacons which are assigned to this checkout-terminal and for which this checkout-terminal is the nearest checkout-terminal. This ensures that every beacon selectively broadcasts the terminal-ID and in addition a current, valid check-value of the one of the checkout-terminal lying closest to this beacon.

The check-values are preferably created and assigned to the checkout-terminals at regular intervals, e.g., at least once a day, in particular at least once an hour, in particular at least once every 5 seconds or even more frequently, whereby the check-values previously used become invalid permanently or for a longer period of time, e.g., several hours, days or weeks. The creation of new check-values ("check-value rotation") may ensure that check-values which may become known to a large number of customers over the time cannot be misused to compromise the system. The synchronization ensures that the beacons always emit the currently valid check-value and terminal-ID of the nearest checkout-terminal and that the server also always knows the currently valid check-value assigned to a particular terminal ID. In case a customer should use a check-value known from a previously executed shopping process to try to compromise the system, e.g., by crating fake payment request or terminal-check-in-requests comprising a previously used check-value, the server will notice that the request is invalid or even malicious, because it comprises an invalid, outdated terminal-ID. Hence, check-value rotation in combination with a server configured to process only payment-requests and terminal-check-in-requests refereeing to a valid check-value may significantly increase the security of the method performed by the electronic retail self-checkout system.

For example, the client-app can be configured to perform the beacon-signal based position determination via trilateration: the beacons may send data according to Apple's iBeacon standard: the beacon signal of each beacon comprises a UUID (e.g. a 32 digit) which identifies the manufacturer of the beacon. In addition, the beacon signal comprises a major and/or a minor UUID (each e.g. a 16 bit int) which is used as an identifier of the checkout-terminal to which the beacons emitting the beacon signal with said major or minor UUID are assigned. The assignment of checkout-terminals and terminal-specific identifiers/UUID is not only stored in a data storage of the respective checkout-terminal but is also stored in a data store accessible by the server computer.

According to embodiment, the client application continuously determines its own position based on the beacon signals received from the beacons of one or more of the checkout-terminals. For example, the position determination performed by the client application can comprise, for each beacon:

determining the beacon signal strength and preferably also the signal measurement accuracy; typically, these data is provided by the operating system of the portable telecommunication device which supports the near field signaling technique the beacon uses;
  calculating the distance of the portable telecommunication device to the beacon and preferably also the distance accuracy based on the determined signal strength and measurement accuracy;
  computing the distance of the portable telecommunication device relative to each of the one or more check-out terminals as a function of the calculated distance of the portable telecommunication device to one or more beacons, whereby a database ("knowledge base") comprising the positions of the beacons relative to the one or more checkout-terminals is also used as input. The knowledge base can be stored in the client program and/or can be stored in the server and the distance computation can be performed by the client application alone or in interaction with the server application.

According to preferred embodiments (which support a high-precision position detection), the beacon signal strength is in addition used for computing and determining whether a particular customer is present in a defined area (e.g. the scanning area, payment area, outside of both areas) and/or the probability of the user's presence in such defined area. For example, the knowledge base may in addition comprise position information regarding the position of the scanning area and of the payment area relative to the beacons of the checkout-terminal and the determination of the customers position (in or outside of a predefined area) can use an algorithm like tri- or multilateration or can use machine learning models like neural networks.

According to embodiments, the terminal-check-in request comprises not only the terminal-ID of the nearest checkout-terminal, but also information about the position of the customer relative to the scanning area and/or to the payment area. This area-specific position information can be used by the server application to check if the position information in the terminal-check-in-request matches with the position information explicitly or implicitly comprised in the payment request.

For example, the client application may repeatedly perform a beacon signal scan and detect multiple beacons (e.g. beacons 1A, 1B, 1C, 2B). The terminal-ID or other parameters encoded in the signal tells the client application which beacons belong to the same checkout terminal (e.g. beacons 1A, 1B and 1C belong to one checkout terminal 1, beacons 2A, 2B and 2C belong to checkout-terminal 2 and so on). Preferably, the beacons of different checkout-terminals are placed relative to their checkout-terminal ad defined positions (e.g. beacon 1A at position A, which is e.g. the first beacon in the base plate of a checkout-terminal in walking direction).

According to preferred embodiments, the client application uses a trained machine learning model, in particular a neural network, for determining the position of the portable telecommunication device (and hence, of the customer) relative to a particular checkout-terminal.

This may be advantageous, because the measured strength of a received beacon signal depends not only on the distance but also on various factors, such as the sensor chip (e.g. Bluetooth chip) and antenna installed in the portable telecommunication device, the orientation of the phone (and thus of the antenna), or absorbent materials located in the vicinity of the transmitter or receiver (especially the water in the human body, but also, for example, objects that are in a backpack/pocket/handbag with the phone) or reflective materials. The effect of these factors can lead to complete or partial shielding of individual beacons, which is why several beacons are used per checkout-terminal. In addition, these effects lead to sometimes strongly fluctuating received signal strengths of the beacons. This has a negative effect on position determination using algorithmic methods. A prior smoothing of the signal strengths of a single beacon over several measurements (e.g., using median filters or Kalman filters) is often not practicable, since this would require the data of several measurements to be collected, which would take several seconds. The use of machine learning methods such as artificial neural networks has the advantage that such fluctuations can be taken into account in training data and thus in the model. Accordingly, a fast and sufficiently precise position determination is possible.

According to embodiment, the client application comprises a trained machine learning model in the form of a trained neural network. The network is configured to receive the beacon information (signal strength, known beacon position relative to a checkout-terminal and optionally also the accuracy of signal strength determination) and environmental parameters (in particular parameters characterizing the portable telecommunication device, e.g. phone model, operating system, etc.) and is configured to output a probability that the customer is located in the scanning area or the payment area or an area outside of these two areas of a particular checkout-terminal.

According to embodiments, different neural networks for different phone types may be used.

For training the model, training data is collected in different scenarios (e.g., phone in the left or right pocket, phone in backpack, phone in hand, etc.), whereby the training data comprises the signal strength obtained from the multiple beacons of a checkout-terminal, the true/known position (scanning area, payment area, outside-of-the-two areas), and preferably also the signal strength determination accuracy. The signal strengths are annotated with the scenarios which were valid when acquiring the signals and with the known/true position of the persons collecting the beacon signals for generating the training data. Due to the fluctuating Bluetooth signal, the signal strength to be used as the training data is recorded over a period of time.

According to preferred examples, the server repeatedly assigns new check-values to the checkout-terminals installed in a shop, thereby invalidating the previously assigned check-values. The currently valid check-values are synchronized with the checkout-terminals and the beacons to ensure that the check-values broadcast by the beacons always use the currently assigned, valid check-values ("check-value rotation"). By performing position and distance determination based on the beacon signals conveying the same terminal-ID, the client-app can highly accurately determine the position of the customer relative to the checkout-terminal to which the beacons are assigned. By checking if the terminal-check-in request and/or payment-request comprises a valid check-value, fraudulent requests can be identified and blocked.

In order to make a purchase in the depicted store where three checkout-terminals 620-624 are installed, the customer must first authenticate himself to the client app and/or to the server app. For this purpose, the customer enters the authentication data determined during the registration process into his smartphone 604. Preferably, this is done before, during or after the customer enters the merchant's store via the entrance 616. This process is also referred to as a system-check-in or shop-check-in, and it results in a session being created within which the customer has pre-authorized the payment account associated with his customer account or has pre-authorized a predetermined maximum amount for the planned purchase.

The customer can now start shopping. For this purpose, the customer may, for example, visit various merchandise shelves 618 and place various products 608, each of which is identified with an RFID tag 610, in his shopping container 606. The container 606 may be a container that the customer brings with him, for example a bag or a backpack or basket. However, it may also be a container that is provided by the store (for example, a plastic bag or shopping cart). The shop owner cannot track the customer's position in the store, because the position determination is performed by the client application of the customer's smartphone. While shopping, the client application on the customer's smartphone continuously tries to receive and evaluate beacon signals to determine the customer's current position relative to the checkout-terminals of the store.

Once the customer has transferred all of the desired goods to the shopping container 606, the customer approaches one of the checkout-terminals to pay for the goods. In the example shown here, the customer approaches the checkout-terminal 624. When the customer reaches the checkout-terminal, he eventually enters the scanning area 210 of the checkout-terminal 624 and holds the shopping container in the scanner unit. Thereby, the app on the smartphone continuously determines the current position of the customer and thus the relative position of the customer to the checkout-terminals 620-624. Thus, the client app determines that the checkout-terminal 624 is the closest checkout-terminal for the customer.

The client-app will also determine if and when the customer is so close to the checkout-terminal that a terminal-check-in request is automatically created and sent to the server. For example, the beacons may be positioned such that a customer standing on the ground plate of the checkout-terminal will approximately have the same distance to all beacons associated with that checkout-terminal. Hence, the determination that the beacon signal strength of all beacons associated with checkout-terminal 624 is approximately identical (and larger than the signal strength of the beacons of other checkout-terminals) may trigger the creation and submission of a terminal-check-in request for the customer at checkout-terminal 624. The request is sent to the server application running on the server computer 612. The request includes the checkout-terminal identifier and preferably also the check-value of the checkout-terminal 624 closest to the customer (the terminal-ID is encoded in the received beacon signals) and also an identifier of the customer (which is known to the client application based on the session). The server application can optionally check whether the check-value specified in the terminal-check-in-request is valid and, if so, confirms a successful check-in operation of the customer at checkout-terminal 624.

The customer can cancel the terminal-check-in process and the scanning process at any time. The customer can cancel the process by moving away from the vicinity of the checkout-terminal 624. The client application is configured to continuously evaluate all beacon signals which can be received to determine the current position of the customer throughout the checkout process and to abort the checkout process if the customer moves too far away from the checkout-terminal.

The beacon-signal/multilateration-based terminal-check-in is executed fully automatically in the background and does not require any manual action on the part of the customer. Hence, the process is very fast, queues are avoided and the customer can concentrate fully on inserting the shopping container into the checkout-terminal's scanner unit. As soon as the container-presence-sensor contained in the scanner unit detects that a container has been completely inserted into the canyon of the scanner unit, the scanning process is started. The scanning process is automatically terminated when the electronic labels of all goods in the container have been read. Preferably, the successful completion of the scanning process is indicated to the customer via an electronic display of the checkout-terminal 624. The customer may also be prompted via the display to initiate payment for the scanned products by stepping onto the payment area 212.

The customer's stepping from the scanner area 210 to the payment area 212 is detected by person-presence-sensors of the checkout-terminal 624, and automatically triggers the sending of a payment request from the checkout-terminal 624 to the server.

For example, the person-presence-sensors can be a series of several, e.g., 6, ultrasonic sensors which are designed to monitor an area next to the scanning unit as a virtual grid of sub-areas. The data processing system performs distance measurements based on the ultrasonic signals received from the sensors to detect the occupancy of the virtual grid elements, and, in particular, to determine if a person (and only one person) has left the scanning area and entered the payment area.

The payment request includes the current terminal ID of the checkout-terminal 624 and information encoded in the RFID tags read by the scanner unit of checkout-terminal 624 during the scanning process.

In some implementation examples, the RFID tags include all relevant product-related data, for example, the product name or price. In other examples, the RFID tags include only an inventory number, with the server computer having access to a product database comprising an assignment of inventory numbers and additional product-related information. In this case, the server can use the database to determine additional product data of the goods in the scanned container, such as the name and price of individual goods, based on the inventory numbers comprised in the payment request, and supplement the payment request with the data in the database.

The server application validates the received and optionally supplemented payment request. For example, the validation may include checking whether a check-value contained in the payment request is a currently valid check-value assigned by the server to the terminal ID. In addition, the server checks whether a valid and recent terminal-check-in request has been received for the checkout-terminal 624 specified in the payment request. In other words, the server checks whether a client has submitted a terminal-check-in-request for the checkout-terminal 624 to the server in close temporal proximity to the receipt of the payment request from the checkout-terminal. Only if this is the case, the server initiates the payment of the purchase price to the debit of the customer.

In further optional steps, the server may communicate the result of initiating the payment to the checkout-terminal 624. This step may comprise notifying the checkout-terminal that the payment was successfully initiated or completed. The checkout-terminal may display this information to the customer, for example, via an electronic display unit. In addition, the server may communicate the result of the initiation of the payment to the client application of the customer. The information that the payment was successfully completed may cause the client application to terminate the session, so that it would now be necessary for the user to re-authenticate to the client application in order to shop with it again.

In addition, or alternatively, the client application may be configured to exit the session when the customer has exceeded a minimum distance from the checkout-terminal 624 and/or when the customer actively terminates the session on his smartphone. The end of the session also implies an end to the beacon-signal based position determination automatically performed in the background.

Figure 8:
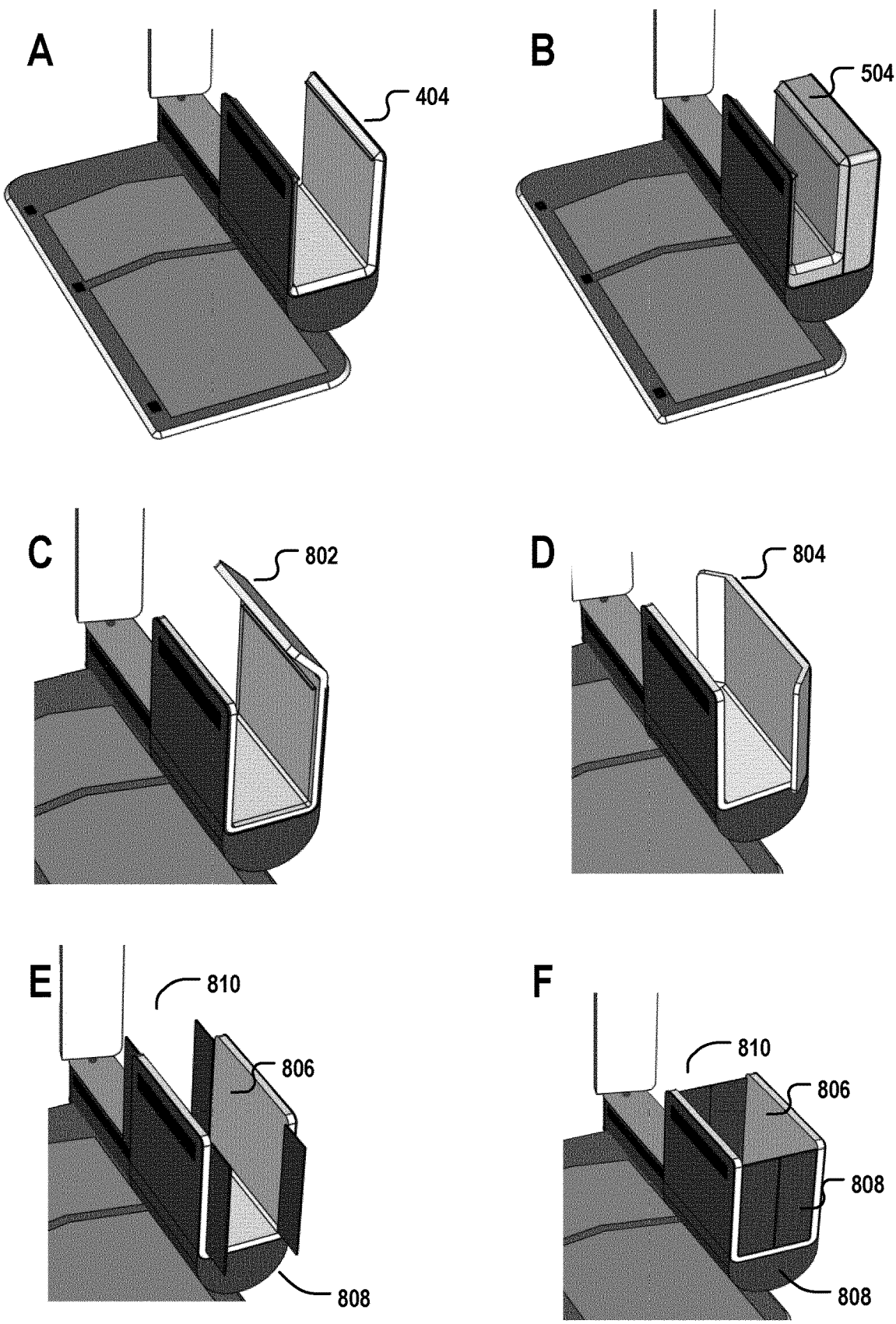
FIG. 8 illustrates different variants of the insert unit of the scanning unit.

FIG. 8 illustrates a set of different insert units configured for insertion into a base unit of the scanning unit. Some or all of the depicted insert units can be used to customize the scanning unit of the checkout-terminal to the product portfolio offered in a shop or to other shop-related aspects.

For example, FIG. 8A shows a checkout-terminal with a scanning unit whose insert unit is particularly suitable for scanning large products with large product tags, such as textiles.

FIG. 8B shows a checkout checkout-terminal with a scanning unit whose insert unit is particularly suitable for scanning small products with small product tags, such as cosmetics.

FIG. 8C shows a scanning unit with an insert unit 802 that has two vertical walls of different heights. The higher wall is inclined inwards in the direction of the scanning valley. Preferably, this inclined wall contains materials that absorb or reflect radio waves, thereby ensuring that only the RFID tags of products located within the scanning valley are read.

FIG. 8D shows a scanning unit with an insert unit 804 having two vertical walls of different lengths. The longer wall is inclined inward toward the scanning valley at both the insertion opening of the scanner valley and the output opening of the scanner valley. Preferably, this sloped wall includes materials that absorb or reflect radio waves, thereby ensuring that only the RFID tags of products located within the scanning valley are read.

FIGS. 8E and F show a scanning unit with an insert unit 806 that includes automatic hinged doors at both the insert opening 808 and the output opening 810 of the scanning unit. For example, the controller in the base unit may be configured to selectively open only the doors at the input-opening 808 or both doors automatically when a person enters the scanning area 210. The controller may further be configured to selectively open only the doors at the output opening 810, or both doors including the door at the input opening, automatically when a person enters the payment area. Preferably, the doors or flaps are made of a material that absorbs or reflects radio waves, thereby ensuring that RFID tags located outside the scanning unit opening are not detected by the scanning process.

The invention claimed is:

1. A method executed by an electronic retail self-checkout system, the system comprising:
one or more checkout-terminals respectively comprising:
a scanning unit and a person-presence-sensor;
a plurality of beacons per checkout-terminal, wherein a beacon is a hardware transmitter configured to broadcast a signal to nearby portable telecommunication devices for enabling the portable telecommunication devices to determine their position based on the signals; and
a server computer operatively coupled to portable telecommunication devices of multiple customers and to the one or more checkout-terminals;
wherein the method comprises:
receiving, by the server computer, a terminal-check-in request from the portable telecommunication device of one of the customers, the terminal-check-in request comprising a customer-ID of the customer and comprising beacon signal information indicative of the one of the one or more checkout-terminals where the customer tries to perform the terminal-check-in;
reading, by the scanning unit of the one checkout-terminal, information from product tags attached to goods that are one or more of: positioned in, and positioned within, a predefined distance to a cavity of the scanning unit;
upon determining, by the one checkout-terminal via its person-presence-sensor, that a person is one or more of: present in, and moves within, an area within a predefined spatial proximity of the one checkout-terminal, sending by the one checkout-terminal a payment request to the server computer, the payment request comprising the read tag information and a terminal-ID of the one checkout-terminal;
receiving, by the server computer, the payment request from the checkout-terminal;
verifying, by the server computer, whether a time interval between receiving the terminal-check-in request and the payment request for the same one of the one or more checkout-terminals is below a threshold value; and
only if the time interval is below the threshold, initializing, by the server computer, a payment transaction for the customer from whose portable telecommunication device the terminal-check-in request was received based on information in the payment request.

2. The method of claim 1, wherein the area comprises a scanning area and a payment area and wherein the method comprises:
continuously determining, by the checkout-terminal via the person-presence-sensor, one or more of the following: the number of persons standing in the scanning area, and the number of persons standing on the payment area.

3. The method of claim 2, wherein each of the checkout-terminals is coupled to one or more light sources and wherein the method further comprises:
controlling, by the checkout-terminal, the operation of the light sources such that one or more of the following occurs: the customer is guided to enter the scanning area, and the customer is guided to enter the payment area.

4. The method of claim 2, wherein the checkout-terminal is configured to do one or more of the following:
automatically initiate the scanning unit to start reading the information on the tags of the goods in the cavity of the scanning unit upon the person-presence-sensor determining that a person has entered the scanning area; and
automatically send the payment request to the server computer upon the person-presence-sensor determining that a person moved from the scanning area to the purchase payment area.

5. The method of claim 1, wherein the person-presence-sensor comprises one or more of:
one or more ultrasonic sensors;
one or more optic sensors; and
one or more pressure sensors.

6. The method of claim 1,
wherein the scanning unit comprises walls forming a canyon-shaped or tunnel-shaped cavity,
where the walls comprise one or more item sensors for reading the product tags, the item sensors being one or more of: RFID sensors and optical sensors; and
wherein a side of the scanning unit facing towards the area comprises the person-presence-sensor.

7. The method of claim 1,
wherein the scanning unit comprises a base unit and an insert unit, the insert unit being designed as an exchange component which can be repeatedly removed from and re-inserted into the base unit.

8. The method according to claim 1, further comprising:
receiving, by the portable telecommunication device, authentication data from the customer before the customer has selected any one of the goods for purchase, before, upon or after the customer entering a shop;
upon successful authentication of the customer at the portable telecommunication device, starting, by the portable telecommunication device, a session, whereby the session is associated with a payment source of the customer and wherein within the session the customer has pre-authorized the payment transaction such that the payment transaction will be initialized without any further interaction of the customer with the portable telecommunication device or the checkout-terminal if the time interval is below the threshold, whereby payment transactions are disabled by the portable telecommunication device for the customer upon expiry of the session; and
maintaining the session by the portable telecommunication device until the portable telecommunication device receives one or more of the following signals:
a session termination command entered by the customer;
a session termination by time expiration;
a signal of the server computer that a payment transaction was performed successfully;
a signal of a client application installed on the portable telecommunication device indicating that the customer has left the shop; and
a signal of a client application installed on the portable telecommunication device indicating that no beacon signal of sufficient strength is received.

9. The method according to claim 1, further comprising generating the terminal-check-in request, the generation comprising:
continuously while the customer does one or more of the following: moves within the area, and approaches any one of the one or more checkout-terminals:
receiving, by the portable telecommunication device of the customer, beacon signals from multiple beacons of one or more of the one or more checkout-terminals, the beacon signals comprising information being indicative of the checkout-terminal to which each beacon is assigned;

determining, by the portable telecommunication device, the one of the one or more checkout-terminals being closest to the customer and determining the distance between the customer and to a specified area next to this closest checkout-terminal as a function of the received beacon signals; and upon determining that the distance to the specified area is below a predefined threshold value, automatically generating, by the portable telecommunication device, the terminal-check-in request, the terminal-check-in request comprising an identifier of the determined closest checkout-terminal, wherein the distance is determined by using multilateration.

10. The method according to claim 1, the scanning unit comprising a container-presence-sensor, the method further comprising:

continuously or upon the person-presence-sensor determining that a person has entered a scanning area, determining, by the container-presence-sensor, the position of a container having been introduced into a cavity formed by walls of the scanning unit; and one or more of the following:
  in case one or more of the position and orientation of the container is determined to prevent a successful reading of the tags of all goods comprised in the container, one or more of: preventing initialization of the scanning process, and outputting a warning that the container is not placed properly in the scanning unit; and
  in case one or more of the position and orientation of the container is determined to allow successful reading of the tags of all goods comprised in the container, one or more of: automatically performing the scanning process, and enabling the initialization process upon determining that a person has entered a scanning area in spatial proximity to the scanning unit.

11. The method according to claim 10, wherein the container-presence-sensor comprises one or more of:
  one or more ultrasonic sensors directed towards the cavity formed by the walls of the scanning unit; and
  one or more time-of-flight (TOF)-based distance sensors directed towards the cavity formed by the walls of the scanning unit, the one or more TOF-based distance sensors being laser-based TOF sensors.

12. The method according to claim 1, wherein the goods whose product tags are read by the scanning unit are comprised in a container, wherein the container comprises a container-tag which encodes a container-ID, wherein the container-ID is read by the scanning unit together with the information from product tags attached to goods, and wherein the payment request in addition comprises container-ID, the method further comprising:

receiving, by the server computer, a container-registration-request, the container registration request comprising a customer-ID of the one customer and a container-ID of a container to be assigned to the customer for at least the duration of the shopping process; and evaluating, by the server computer, whether a container-registration-request was received comprising the said container-ID and comprising the customer-ID of the customer for whom the payment transaction is to be initialized; and performing the initialization of the payment only if this is the case.

13. The method of claim 2, wherein the checkout-terminal is configured not to send the payment request in case a) the number of persons standing on the scanning area exceeds 1 or in case b) the number of persons standing on the payment area exceeds 1 or c) the number of persons standing on the scanning area and the payment area combined exceeds 1.

14. The method of claim 9, wherein the distance is determined by using trilateration.

15. An electronic retail self-checkout system comprising:
  one or more checkout-terminals respectively comprising: a scanning unit and a person-presence-sensor;
  a plurality of beacons per checkout-terminal, wherein a beacon is a hardware transmitter configured to broadcast a signal to nearby portable telecommunication devices for enabling the portable devices to determine their position based on the signals; and
  a server computer operatively coupled to portable devices of multiple customers and to one or more checkout-terminals;
  wherein the system is configured for:
    receiving, by the server computer, a terminal-check-in request from the portable device of one of the customers, the terminal-check-in request comprising a customer-ID of the customer and comprising beacon signal information indicative of the one of the one or more checkout-terminals where the customer tries to perform the terminal-check-in;
    reading, by the scanning unit of the one checkout-terminal, information from product tags attached to goods that are one or more of: positioned in, and within, a predefined distance to a cavity of the scanning unit;
    upon determining, by the one checkout-terminal via its person-presence-sensor, that a person is one of more of: present in, and moves within, an area within a predefined spatial proximity of the one checkout-terminal, sending by the one checkout-terminal a payment request to the server computer, the payment request comprising the read tag information and a terminal-ID of the one checkout-terminal;
    receiving, by the server computer, the payment request from the checkout-terminal;
    verifying, by the server computer, whether a time interval between receiving the terminal-check-in request and the payment request for the same one of the one or more checkout-terminals is below a threshold value; and
    only if the time interval is below the threshold, initializing, by the server computer, a payment transaction for the customer from whose portable device the terminal-check-in request was received based on information in the payment request.

16. The system of claim 15, further comprising:
the portable telecommunication devices of one or more of the customers.

17. The system of claim 15,
wherein the server or each of the checkout-terminals is configured to repeatedly assign new check-values to the checkout-terminals, each assigned check-value being unique, thereby invalidating the check-values previously assigned to the one or more checkout-terminals;
wherein the server, the checkout-terminals and the beacons are configured to synchronize the newly assigned check-values such that the beacon signals emitted by the beacons comprise the currently assigned check-value of the checkout-terminal to which the beacons are assigned; and wherein the server is configured to check whether the check-value specified in one or more of: a terminal-check-in-request, and a payment-request, is a valid check value currently assigned to one of the checkout-terminals, and not to initialize the payment transaction in case the check-value is invalid.

\* \* \* \* \*